(12) United States Patent
Johnson

(10) Patent No.: US 9,183,614 B2
(45) Date of Patent: Nov. 10, 2015

(54) PROCESSOR, SYSTEM, AND METHOD FOR EFFICIENT, HIGH-THROUGHPUT PROCESSING OF TWO-DIMENSIONAL, INTERRELATED DATA SETS

(75) Inventor: William M. Johnson, Austin, TX (US)

(73) Assignee: Mireplica Technology, LLC, Austin, TX (US)

( * ) Notice: Subject to any disclaimer, the term of this patent is extended or adjusted under 35 U.S.C. 154(b) by 519 days.

(21) Appl. No.: 13/602,958

(22) Filed: Sep. 4, 2012

(65) Prior Publication Data

US 2013/0307859 A1 Nov. 21, 2013

Related U.S. Application Data

(60) Provisional application No. 61/530,965, filed on Sep. 3, 2011.

(51) Int. Cl.
*G06T 1/20* (2006.01)
*G06T 1/60* (2006.01)
*G06F 13/00* (2006.01)
*G06F 15/16* (2006.01)
*G06F 15/80* (2006.01)

(52) U.S. Cl.
CPC . *G06T 1/60* (2013.01); *G06F 15/80* (2013.01); *G06T 1/20* (2013.01)

(58) Field of Classification Search
None
See application file for complete search history.

(56) References Cited

U.S. PATENT DOCUMENTS 5,995,747 A * 11/1999 Guttag et al. ............. 712/221
6,948,050 B1 * 9/2005 Gove et al. .................. 712/35
8,108,622 B2 1/2012 Nonogaki et al.
2005/0257026 A1 11/2005 Meeker
2007/0245123 A1 10/2007 Stuttard et al.
2008/0235490 A1* 9/2008 Jones et al. .................. 712/15

FOREIGN PATENT DOCUMENTS

EP 0293700 12/1988

OTHER PUBLICATIONS

International Search Report & Written Opinion mailed Dec. 13, 2013 for PCT/US2013/054340.

* cited by examiner

*Primary Examiner* — Tize Ma
(74) *Attorney, Agent, or Firm* — Gentry C. McLean; Daffer McDaniel, LLP

(57) ABSTRACT

Systems, processors and methods are disclosed for organizing processing datapaths to perform operations in parallel while executing a single program. Each datapath executes the same sequence of instructions, using a novel instruction sequencing method. Each datapath is implemented through a processor having a data memory partitioned into identical regions. A master processor fetches instructions and conveys them to the datapath processors. All processors are connected serially by an instruction pipeline, such that instructions are executed in parallel datapaths, with execution in each datapath offset in time by one clock cycle from execution in adjacent datapaths. The system includes an interconnection network that enables full sharing of data in both horizontal and vertical dimensions, with the effect of coupling any datapath to the memory of any other datapath without adding processing cycles in common usage. This approach enables programmable visual computing with throughput approaching that of hardwired solutions.

2 Claims, 28 Drawing Sheets

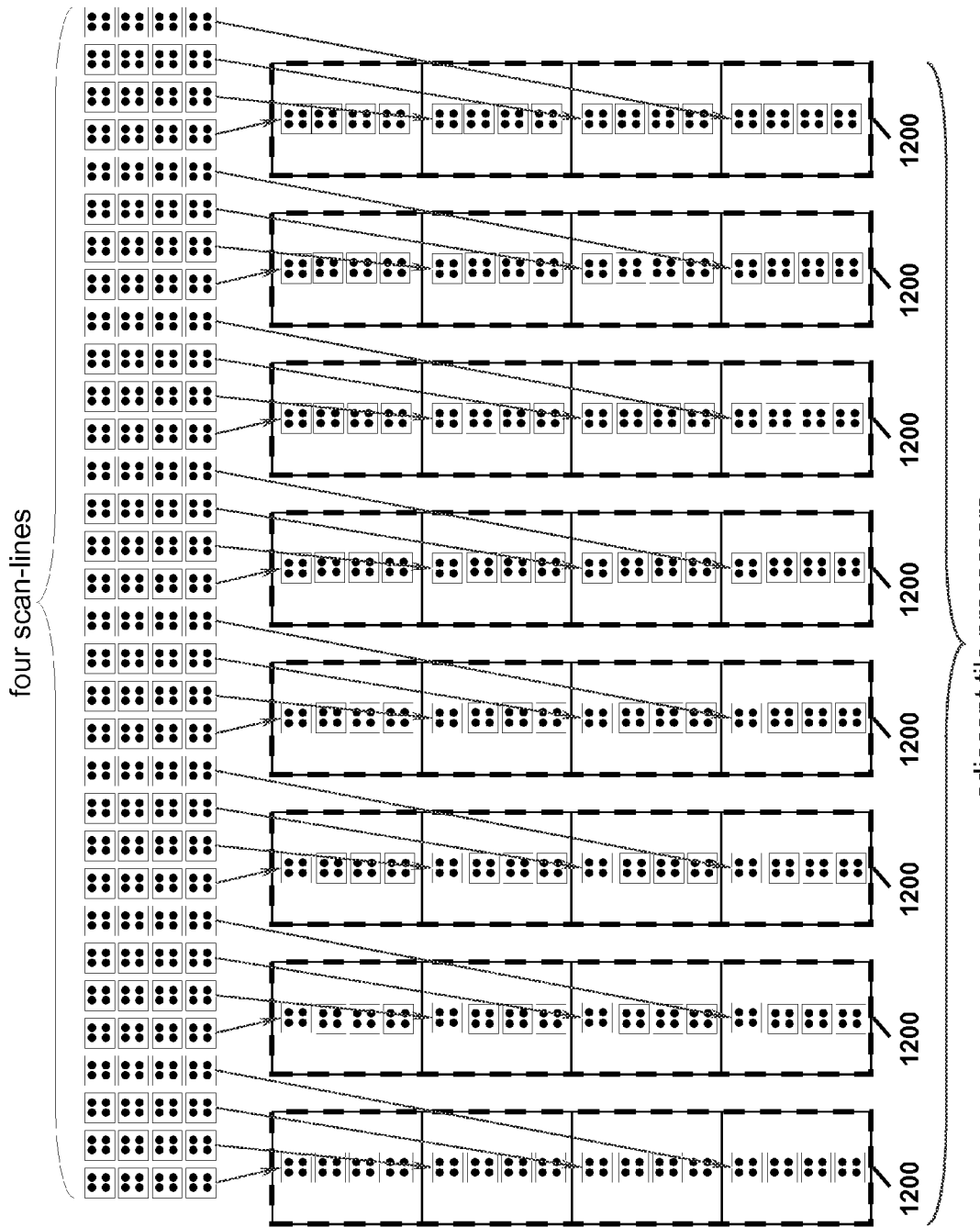

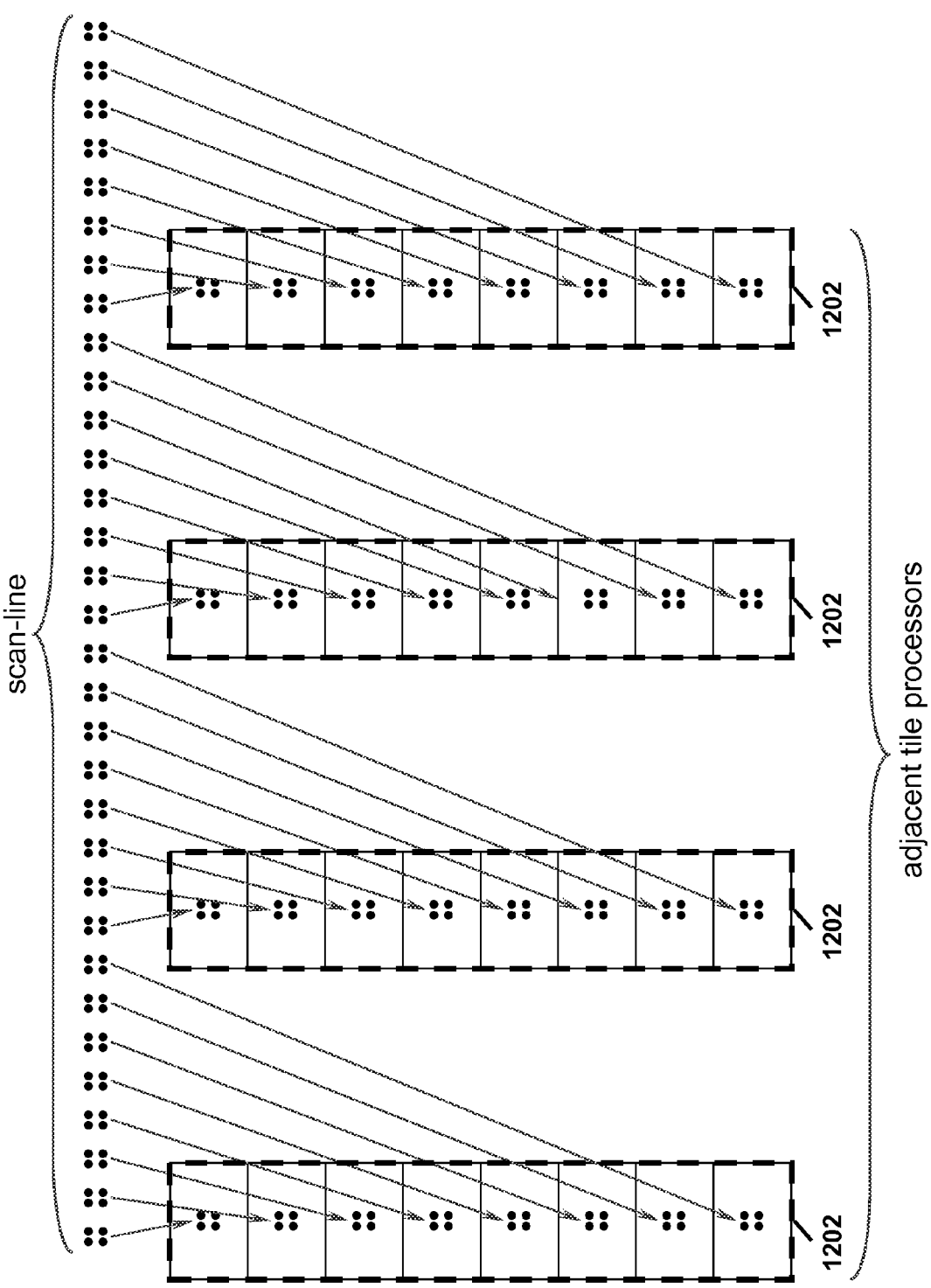

Table access

| 1 | 2 | 3 | 4 | 5 | 6 | 7 | 8 | 9 |
|---|---|---|---|---|---|---|---|---|
| Execute Load | Local/L1 | L2/L3 | L4/L5 | DMEM Access | L4/L5 | L2/L3 | Local/L1 | Write Register — 1904 |

Fig. 19C

L4/L5 route

| 1 | 2 | 3 | 4 | 5 | 6 | 7 | 8 | 9 | 10 | 11 | 12 | 13 |
|---|---|---|---|---|---|---|---|---|---|---|---|---|
| Execute Load | Local/L1 | L2/L3 | L4/L5 | Local/L1 | DMEM Access | Local/L1 | L2/L3 | L4/L5 | L2/L3 | L2/L3 | Local/L1 | Write Register |

PROCESSOR, SYSTEM, AND METHOD FOR EFFICIENT, HIGH-THROUGHPUT PROCESSING OF TWO-DIMENSIONAL, INTERRELATED DATA SETS

PRIORITY CLAIM

This application claims the benefit of U.S. Provisional Application No. 61/530,965 filed Sep. 3, 2011.

BACKGROUND

Many applications involve two-dimensional data sets. Visual processing applications are one example. The term "visual processing" as used herein refers to a general class of processing of image and video picture elements ("pixels") and related data. This includes applications such as enhancing images and converting pixels formats, motion detection and tracking, and identifying features or objects in either still-image or video frames. Other applications involving data that can be expressed in two-dimensional sets include modeling of physical quantities such as forces or electromagnetic fields. Three-dimensional data sets can in some cases be represented in two-dimensions, such as by projection or transformation into a two-dimensional plane, or as multiple adjacent two-dimensional data sets. Prior-art solutions have taken one of two forms: 1) programmable solutions using a processing core, or 2) hardwired (or hardware-configurable) solutions using hardware logic gates. The distinction between these options is that programmable solutions are flexible and can be readily improved and adapted to various applications, though with very low performance relative to hardwired solutions, whereas hardwired solutions can readily meet performance requirements, though are very difficult to design, maintain, and improve to meet new requirements.

It is desirable to have solutions that combine the advantages of programmable and hardwired processing without the corresponding disadvantages. Consider, as an example, the case of visual processing applications. The term "visual computing" as used herein refers to a programmable approach, based on a computing architecture that is specifically targeted to visual processing, in contrast to using a general-purpose processor. Though many examples of visual-computing solutions exist, all have a fundamental limitation in capability. This limitation becomes particularly acute with state-of-the art sensor and display resolutions, and with increasing frame rates in frames per second.

To understand the nature of this limitation, it is first necessary to understand the typical requirements of visual processing. FIG. 1 illustrates some typical stages for processing a still image in a digital camera. The input from the sensor 100 contains red, green, and blue pixel values, or data elements, in a Bayer mosaic (this format contains twice as much green information as red and blue because of the sensitivity of the eye to green information). Processing performs quality enhancement and format conversion, producing YUV data 108 that can be used to create standard image formats such as JPEG (YUV are three pixels of luminance and chrominance information). Though a Bayer pattern is shown in this example, there are many non-standard, proprietary formats that typically are vendor-specific. This is one motivation for programmable solutions, so that various formats can be processed by a common solution.

Pixel processing typically produces a pixel value at a given location based on neighboring pixel values. For example, the noise reduction stage 104 is based on comparing the value of a given pixel to the values of pixels, of the same format, in its local neighborhood. If the value is above or below some threshold of a value predicted by averaging neighboring pixel values, this is considered to be due to noise, such as lens impurities or sensor defects. In this case, the pixel value is replaced by the predicted value. Other processing stages, such as white balance stage 106, typically use the same approach of considering neighboring pixel values. Black level adjustment 102 is an exception, because it simply subtracts known offsets from each pixel value to compensate for drift in pixel values from zero for purely dark input.

This approach to processing causes input and output relationships between processing stages such as that shown in FIG. 2. This example assumes that an output pixel depends on a neighboring region of pixels, such that a central pixel depends on two columns of pixels to the right and left and two rows of pixels above and below: the total input region is a block of pixels that is 5 pixels wide and 5 pixels high (5×5), with the output corresponding to the central pixel in this block. In this example, assuming that processing stages shown in FIG. 1 are numbered sequentially, a 9×9 input region 200 to processing stage N results in a 5×5 output region 202, which becomes the input to processing stage N+1, and this 5×5 region in turn generates a single pixel 204 as the output of stage N+1.

Regions of pixels that are required as input, but which do not have any corresponding output, are referred to as aprons. Apron requirements cause the size of the result region of a processing stage to be smaller than the input region, and this reduction is larger the more complex, and therefore higher-quality, the processing. Higher quality requires a larger number of processing stages and a larger number of apron pixels used at each stage to produce output.

The operation of typical prior-art visual-processing hardware is illustrated in FIG. 3, with processing stages corresponding to those in FIG. 2. The input to stage N is provided by memory buffer 300. This buffer retains sufficient context to satisfy apron requirements, with input being provided one set of pixels at a time, where a set of pixels in this example is a set of four pixels such as the four pixels 302. Each set of input pixels is sufficient to generate one set of output pixels, because input of the set of pixels that fills the buffer satisfies the apron requirements for the pixels in the center of the buffer. For example, input of pixel set 302 fills the buffer to satisfy the apron requirements for pixel set 304 centered in the 5×5 region having 5 sets of 4 pixels in each direction. Scanning hardware 306 accesses pixels in this 5×5 region, providing input to operation hardware 308 for stage N. Scanning hardware is required because each input set is at a different location within the image, and the relative locations in buffer 300 of the pixels required for stage N changes with each input set. Correspondingly, the output of stage N is processed by merging hardware 310, which writes the output of stage N for multiple input pixel sets into buffer 312 in a way that preserves results written into this buffer from operations on previously-scanned pixel sets. Buffer 312 is shown offset to clarify the relative positions of the pixels in this buffer with respect to the pixels in buffer 300. The output enabled by pixels 302 updates the pixels 314 in buffer 312, enabling input to stage N+1 for the region of pixels 316 in buffer 312.

The configuration of hardware shown in FIG. 3 cannot be replicated by a software program, because all of the hardware processing stages operate concurrently (upon pixels at different locations along the scan line), whereas software programs execute one instruction at a time and cannot control the concurrent operations. Each hardware stage is hardwired, or has limited hardwired configurations, to operate concurrently with other stages. The throughput of these stages is typically one set of pixels every processing cycle, so, for example, hardware that operates at 450 mega-Hertz can provide a throughput of 450 mega-pixels per cycle, which is required for state-of-the art sensors, which provide input of 30 mega-pixels per frame at a rate of 15 frames per second. However, because the stages are hardwired, the solution is inflexible.

Programmable solutions overcome this inflexibility. However, because program execution is serial in nature, programs generate a set of outputs only some number of sequential processing steps, or cycles, after input. The number of cycles is determined by the number of processing stages and the complexity of the operations performed at each stage, and is typically on the order of 1000-2000 cycles. Thus, a programmable solution operating at 450 mega-Hertz would provide throughput of at most 0.45 mega-pixels per second, far below the throughput of hardware.

To improve the throughput of programmable visual processing, the program must process and output a large number of pixels at each processing stage. For example, a program that requires 1000 cycles to execute can match the throughput of hardware processing if it produces 1000 sets of pixels of output for each set of input pixels. However, because of apron requirements, the input required to produce this output is much larger than 1000 sets of inputs, except in a hypothetical ideal case illustrated in FIG. 4. In this conceptual illustration, there are a number of processing datapaths 402 equal to the width in pixels of the entire image, operating on data in a memory 400 that is also of this width. Each datapath can access a horizontal region of this memory sufficient for apron access in the horizontal direction, for example two pixels to the right and left for a 5×5 region, and the data is organized into buffers whose depth, in number of lines, is sufficient for apron access in the vertical direction, for example 5 lines deep for a 5×5 region.

Input is provided to this ideal solution an entire scan-line at a time, discarding the oldest scan-line. These lines are represented by horizontal lines 404 in memory 400, labeled in this example with corresponding pixel colors in a Bayer format. Pixels of like format (color) must be in separate buffers, because the program performs the same operations on all pixels at the same time, and these must be of the same format for correct results. The program executes, taking the required number of cycles, and produces a number of pixels proportional to the number of datapaths, which must be on the order of a few thousand to match the throughput of hardware. It should be understood that this example is for illustration only. Operating this many datapaths simultaneously is physically impossible, and would be prohibitively expensive in any case.

Physical limitations restrict the number of datapaths in a typical implementation, with a resulting typical organization shown in FIG. 5. The conceptual memory and datapath bank of FIG. 4 is partitioned into datapath banks 510-516 and memory segments 500-506 corresponding to a number of datapaths that can reasonably be implemented, typically either 32 or 64. However, operating these datapath banks over the entire span of a program, from input to output, causes an unacceptable loss in the effectiveness of execution, represented by the shaded grey regions marked "x" that represent the loss of effective output resulting from the apron requirements at each processing stage. For example, if there are 10 processing stages, each requiring a 5×5 region of input to each stage, the datapath banks each lose 4 pixels of effective context, in the horizontal direction, at each stage. This causes output at the last stage to be 40 pixels narrower than the input, which, in the case of a 64 datapaths, causes the output to be only 24 pixels wide, meaning that the parallel datapaths are only 38% (24/64) effective. To avoid this, it would be required to share data in memories 500-506 between datapath banks 510-516. However, this is not possible because it cannot be guaranteed that the datapaths perform the same operations at the same time, and thus it is not possible to guarantee that data is valid when accessed by a datapath from another memory that is not local to the datapath.

The prior art addresses the aforementioned problem of reduction in output data in partitioned datapaths by performing only a single processing stage at a time, rather than all stages in series, as illustrated in FIG. 6. After a given stage N, the output of stage N is written in a system data-movement operation to a global shared memory 600. Following this, data is read in a system data-movement operation back into the memories local to the datapaths (500-506 in FIG. 5). This read-back operation can be used to minimize data loss for the interior data banks by overlapping the portions of a scan line that are read into the data banks. Repeating the data elements near the end of one data bank at the beginning of the adjacent bank provides the apron needed for each data bank and eliminates data loss at the boundary. The loss of data per processing stage is only that caused by the outer ends of the scan line, for example 4 pixels. This loss is a much smaller proportion of the datapath width than if all processing stages are executed, so the effectiveness of parallel execution is 60/64=94%. However, additional cycles are required to copy the outputs of stage N and the inputs of stage N+1, and these cycles add to the effective execution time and also limit the throughput.

In both of the examples just presented, there is a fundamental throughput limitation for a programmable visual-computing solution. This is caused either by the ineffectiveness of parallel operations caused by inability to share data to meet apron requirements, or by additional cycles required to re-form the shared context in a global memory.

The above discussion illustrates the difficulty of efficient software processing when an operation to be performed on one element of a data set requires access to one or more other elements of the data set—i.e., when the elements in the data set are interrelated, at least with respect to a given operation. Hardware implementations of the operation can handle this situation efficiently by repeatedly acquiring the required input elements through a scanning process. It would be desirable to have an efficient approach to software implementation of operations on interrelated elements in two-dimensional data sets.

SUMMARY

The problems noted above can be successfully addressed by systems, processors and methods for organizing processing datapaths to perform an arbitrarily large number of operations in parallel, executing a single program. These datapaths can be based on any instruction-set architecture. Each datapath executes the same sequence of instructions, using a novel instruction sequencing method, and the datapaths have the effect of executing synchronously regardless of their number. The system includes an interconnection network that enables full sharing of data in both horizontal and vertical dimensions, with the effect of coupling any datapath to the memory of any other datapath without adding processing cycles in common usage. This approach enables programmable visual computing with throughput approaching that of hardwired solutions.

In an embodiment of a data processing system as described herein, at least two data memories are arranged side-by-side along a first direction, with each data memory partitioned along a second direction, substantially perpendicular to the first direction, into at least two regions of identical size. The system also includes data allocation circuitry adapted to store digitally coded data representing elements of a two-dimensional array into successive adjacent memory locations within a first region of the first data memory. The data stored into the first region may represent a first sequence of a predetermined number of adjacent elements along a first dimension of the array.

The data allocation circuitry is further adapted to store data representing sequences adjacent to the first sequence, along the second dimension of the array, into successive adjacent memory locations of respective regions of the data memories adjacent to the first region. The data is stored such that the number of adjacent sequences represented by data stored in regions of the first data memory is the same as the number of regions in the first data memory. In addition, the data stored in the regions of the second data memory represents the same number of adjacent sequences, and sequences represented by data stored in corresponding regions of adjacent data memories are displaced along the second dimension of the array by a number of elements equal to the number of regions in the first data memory In an embodiment, the data processing system also includes instruction routing circuitry adapted to order execution of identical instructions upon data at corresponding addresses in adjacent data memories, where execution of the same instruction is offset by one clock cycle for each adjacent data memory along the first direction. The system may also include at least two instruction execution units coupled to the respective at least two data memories. The instruction execution units are adapted to receive and execute instructions for operations on the elements represented by the data stored in the respective data memory. The data processing system may further include a master processor unit coupled to all of the instruction execution units. The master processor unit is adapted to store, fetch and distribute instructions for operations on the elements represented by the data stored in the data memories.

Another embodiment of a data processing system includes at least two identical data processors, where each data processor includes a data memory partitioned into at least two identical regions and remote access logic for handling data access requests between data processors. The system also includes a master processor adapted to convey a program instruction to a first one of the at least two identical data processors, where the instruction is conveyed for execution using data in one of the regions of the data memory of the first data processor. The system also includes an instruction pipeline connecting the master processor and the data processors in series, and a data processor interconnect structure having a multiplexer corresponding to each of the identical data processors. The output of each multiplexer is coupled to an input of the remote access logic for each of the data processors, and outputs from the remote access logic of each of a local group of the data processors form inputs to each multiplexer. In a further embodiment of this data processing system, the number of data processors in the local group is the same as the number of inputs handled by each of the multiplexers, and each of the multiplexers has a single output. In another embodiment of the system, the interconnect structure also includes an additional remote access multiplexer for each local group of data processors, where the remote access multiplexer has a single output and the same number of inputs as the number of data processors in the local group. The outputs from the remote access logic of each of the data processors in the local group are connected to the inputs of the remote access multiplexer.

An embodiment of a data processor described herein, which may be referred to as a "tile processor," includes a data memory partitioned into at least two regions of identical size, wherein the number of regions is a power of two, an instruction buffer for receiving program instructions, processor logic adapted to execute the program instructions using data stored in the regions of the data memory, and remote access circuitry adapted to use a horizontal address component to specify the route of a data access request between the data processor and any of a group of additional interconnected data processors. In a further embodiment, the data processor may include region state logic for storing an identifier of a subgroup of program instructions being executed by the data processor. In addition, the region state logic may store an indication of which regions of the data memory contain data used in executing a subgroup of program instructions. Such a subgroup of program instructions may end with an instruction requiring movement of data between the data memory and a memory location external to the data memory, and may be referred to herein as a "task interval." In still another embodiment, the data processor may include instruction routing circuitry adapted to decode an instruction fetched from the instruction buffer and simultaneously convey the instruction to an instruction buffer of an adjacent data processor.

A different embodiment of a data processor, which may be referred to herein as a "master tile processor," includes an instruction memory for storing program instructions to be executed, instruction routing circuitry adapted to decode an instruction fetched from the instruction memory and simultaneously convey the instruction to an instruction buffer of an adjacent data processor, and execution control circuitry adapted to repeatedly convey a subgroup of instructions to the adjacent data processor, for execution using data stored in respective successive regions of a partitioned data memory in the adjacent data processor. In a further embodiment, the data processor may also include a control memory adapted to store, for each data element written to one of the regions of the partitioned data memory, an indicator of which subgroup of instructions executed the write of the data element.

In addition to data processors and data processing systems, data processing methods are contemplated herein. The methods may be implemented by program instructions using techniques known to those of ordinary skill in the art. An embodiment of a method of program execution by a master processor includes fetching a first instruction from an instruction memory in the master processor and conveying the first instruction to an instruction buffer of a first data processor coupled to the master processor, where the first data processor is one of at least two data processors coupled to the master processor, and each data processor includes a data memory partitioned into a number of identical regions. The method further includes determining whether execution of the first instruction by the first data processor requires movement of data between the data memory of the first data processor and the data memory of a different data processor. If execution of the first instruction does not require movement of data between the first data processor and a different data processor, the method includes continuing to fetch and convey to the instruction buffer subsequent instructions, until determining that a conveyed instruction requires movement of data between data processors.

A further embodiment of a method of program execution by a master processor includes, upon determining that execution of the conveyed instruction does require movement of data between the first data processor and a different data processor, retrieving the first instruction, and conveying the first instruction to the instruction buffer of the first data processor, for execution using data in a consecutive adjacent region of the data memory of the first data processor. For each adjacent region of the data memory in the first data processor, the method continues with conveyance of a sequence of instructions ranging from the first instruction through the instruction requiring movement of data between data processors, for execution using data stored in the respective region.

An embodiment of a method of program execution by a data processor includes receiving a program instruction in the instruction buffer, decoding the program instruction and simultaneously conveying the instruction to an instruction buffer of an adjacent identical data processor, and executing the program instruction using data in a first region of the data memory. The method further includes determining whether execution of the instruction requires movement of data between the data memory of the data processor and a data memory of a different data processor. If execution of the instruction does not require movement of data between the data processor and a different data processor, the method includes continuing to execute subsequent instructions received in the instruction buffer using data in the same region of the data memory, until determining that an executed instruction requires movement of data between data processors.

A further embodiment of a method of program execution by a data processor includes, upon determining that an executed instruction does require movement of data between the data processor and a different data processor, applying execution of the next instruction received to data stored in the next adjacent region of the data memory. For each adjacent region of the data memory, the method includes execution of a sequence of instructions ending with the instruction requiring movement of data between data processors, where the execution uses data stored in the respective region.

A method for storage of data into partitioned regions of a data memory is also contemplated herein, where the data represents elements of a two-dimensional array. An embodiment of the method includes storing data representing a sequence of a predetermined number of adjacent elements along a first dimension of the array into corresponding successive adjacent memory locations of a first region of the data memory. The method further includes storing data representing adjacent sequences, along a second dimension of the array, of the predetermined number of elements into corresponding successive adjacent memory locations of successive adjacent regions of the data memory. The number of adjacent sequences, including the first sequence, represented by data stored in regions of the first data memory is the same as the number of regions in the first data memory. In an embodiment, the first sequence and adjacent sequences are portions of respective columns of the two-dimensional array. In a further embodiment, the first sequence and adjacent sequences are entire respective columns of the array. In an additional embodiment, the method further includes storing additional adjacent sequences into corresponding successive adjacent memory locations of successive adjacent regions in additional partitioned data memories. In such an embodiment, the data memories are all are arranged side by-side along a direction substantially perpendicular to a direction along which the data memories are partitioned into regions.

The systems, processors and methods described herein are applicable to programmable image and vision processing that efficiently employ up to 4096 datapaths operating in parallel. The processors preferably execute a sequential program written in a high-level language. Datapaths may be allocated in the granularity of a single datapath, depending on application requirements. In an embodiment, the techniques described herein can be adopted to any existing instruction set and C++ compiler. The datapaths may implement full sharing of visual data, across any span of an image or video frame, with an effect analogous to fully interconnected, point-to-point links supporting zero-cycle latency and full coherency. Computation can also include global shared data, lookup tables, and histograms, shared across all datapaths.

BRIEF DESCRIPTION OF THE DRAWINGS

The following detailed description of various disclosed embodiments makes reference to the accompanying drawings in which:

FIG. 13B shows the mapping of a two-dimensional array of pixel data to the data memories of FIG. 13A.
FIG. 14 shows the mapping of a scan-line of pixel data to data memories partitioned into 8 regions;
FIGS. 19A, 19B, 19C, and 19D shows the timing of interconnect routes.

DETAILED DESCRIPTION

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

The following discussion is directed to various embodiments of the systems, processors, and methods described herein. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to suggest that the scope of the disclosure, including the claims, is limited to that embodiment.

Figure 7:
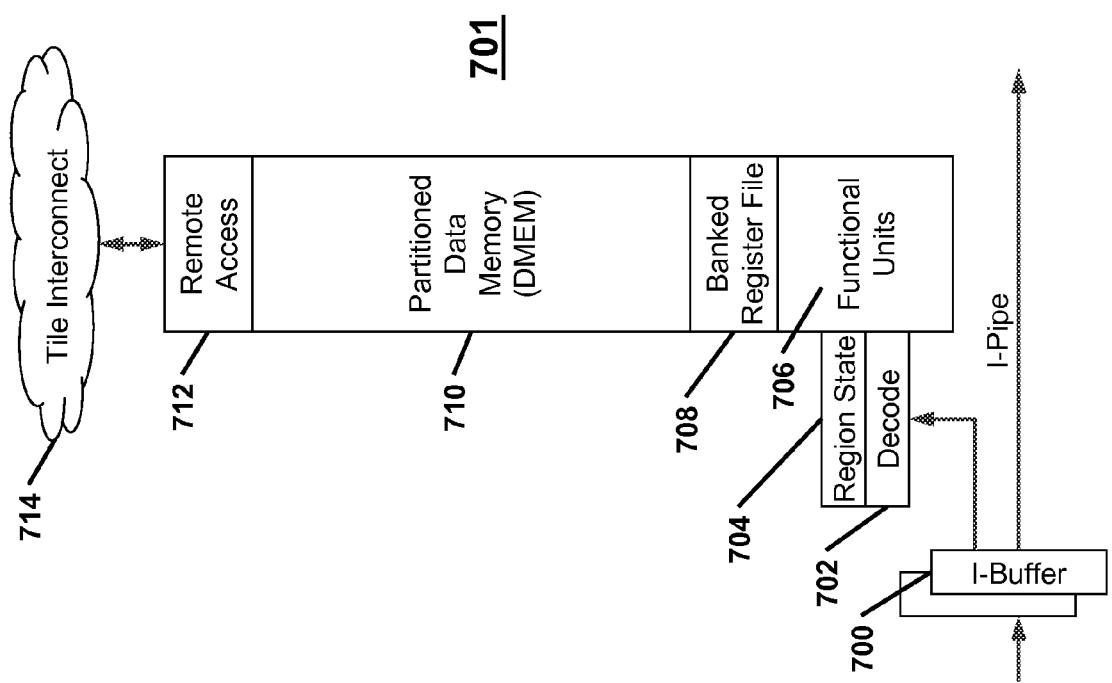
FIG. 7 shows selected components of a two-dimensional array processor, or "tile processor.

FIG. 7 shows selected components of the basic processing element for a visual tile: the term "tile" refers to a rectilinear region, or two-dimensional array, of pixels in a frame, that is either 4, 8, or 16 pixels wide and up to 256 pixels high. Each processing element, or tile processor, operates on a unique tile of pixels, with adjacent tiles mapped to adjacent tile processors. This mapping is described further below following a description of the basic processor organization. Although tile processing is described herein mainly for image processing applications, it should be understood that the disclosed embodiments are believed to be suitable for any applications involving data processing of two-dimensional data sets, particularly two-dimensional interrelated data sets.

The tile processor 701 has many components in common with a conventional processor, with the notable exception of having no instruction memory and no instruction fetch logic. The depiction of FIG. 7 is intended to illustrate the non-conventional components of tile processor 701, and is shaped so as to ease the depiction in FIG. 8 of grouping of multiple tile processors 701. The arrangement of components of tile processor 701 may not reflect all interconnections between the components. Except as stated otherwise herein, tile processor 701 includes the components of a conventional processor (including, for example, power supplies), interconnected in the manner of a conventional processor as is known in the art.

Instead of using conventional instruction memory and instruction fetch logic, tile processor 701 uses instructions that are fetched by a master tile processor, described below, and distributed using an instruction pipeline composed of serial instruction buffer, or I-Buffer, registers 700 that couple all tile processors to the same sequence of instructions. I-Buffer registers are double-buffered, so that any stall that interrupts processing at the local tile processor need propagate only to the tile processor providing the next instruction. For multiple stall cycles, the stall is propagated by the adjacent processor to the next processor, and so on. The style of instruction fetch avoids using a global signal to control stalling, which would not permit operating a large number of tile processors at a high frequency, because of delays in propagating this signal.

Instructions received in I-Buffer 700 are decoded by decode logic 702, and operations are performed on the contents of registers in banked register-file 708 by functional units 706, using loads and stores to fetch operands and write results into partitioned data memory 710 (DMEM). These are conventional processor features that will be familiar to one skilled in the art. Novel features of the tile processor include the region state logic 704, the register-file banking mechanism 708, the data-memory partitioning mechanism 710, remote access logic 712, tile interconnect network 714, and combinations of these. Network 714 is not shown as a discrete hardware block because it represents a fully connected network that couples all tile processors to the DMEM of all other tile processors. These components are described in detail below in the context of the system organization.

Figure 8:
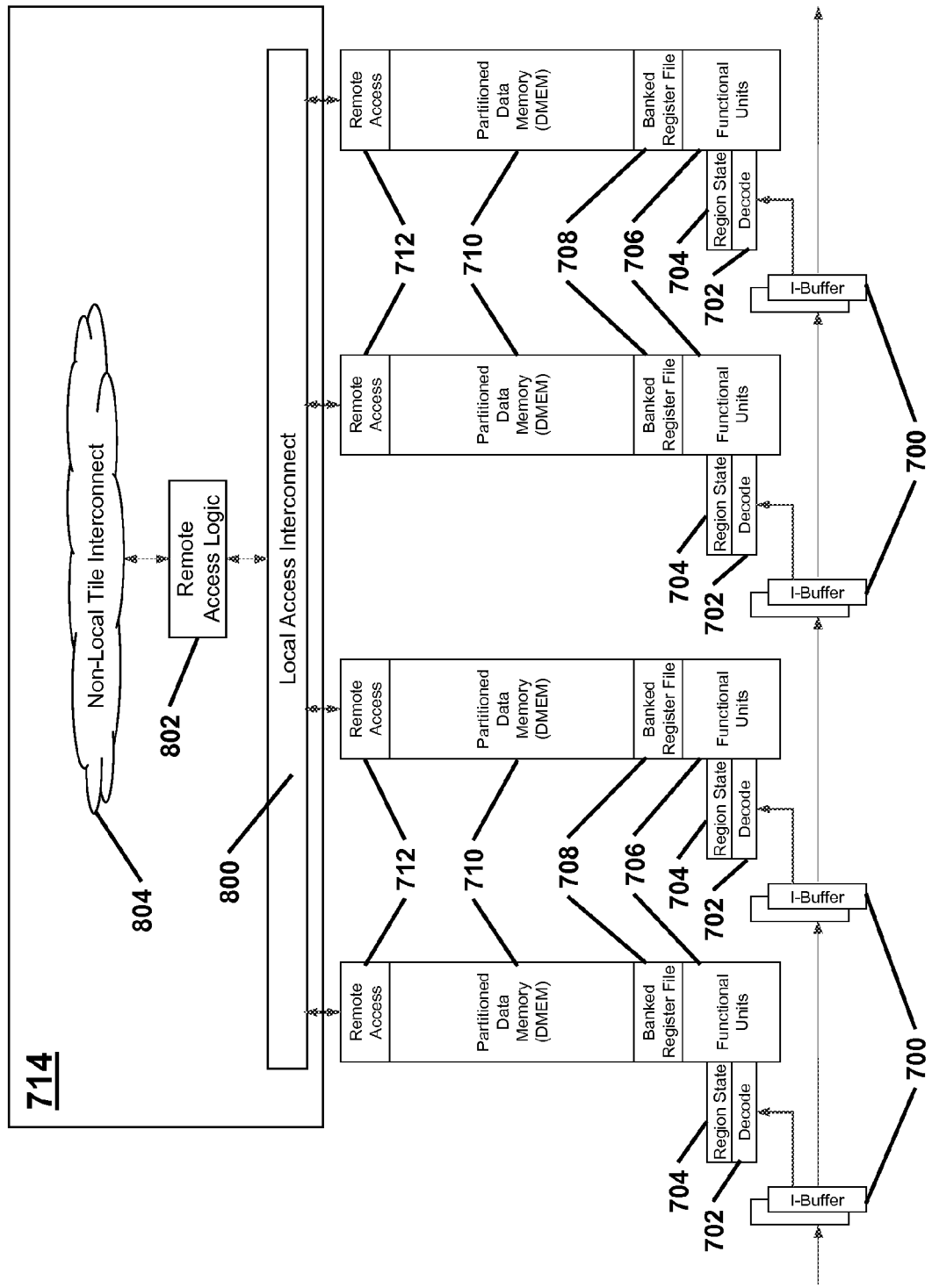
"
FIG. 8 shows a local group of tile processors.

FIG. 8 diagrams the tile interconnect for a local group of 4 tile processors, each organized as shown in FIG. 7. The remote access logic 712 of each tile processor couples to local access interconnect 800, which routes requests from any of the 4 tile processors to any of the others in a single cycle. The remote access logic 802 concurrently determines whether any request is not directed to a processor in the local group, and presents any such request to non-local tile interconnect 804, which couples this non-local request to the ultimate destination. Local access interconnect 800, remote access logic 802, and non-local tile interconnect 804 are specific levels of interconnect network 714 shown in FIG. 7.

Figure 9:
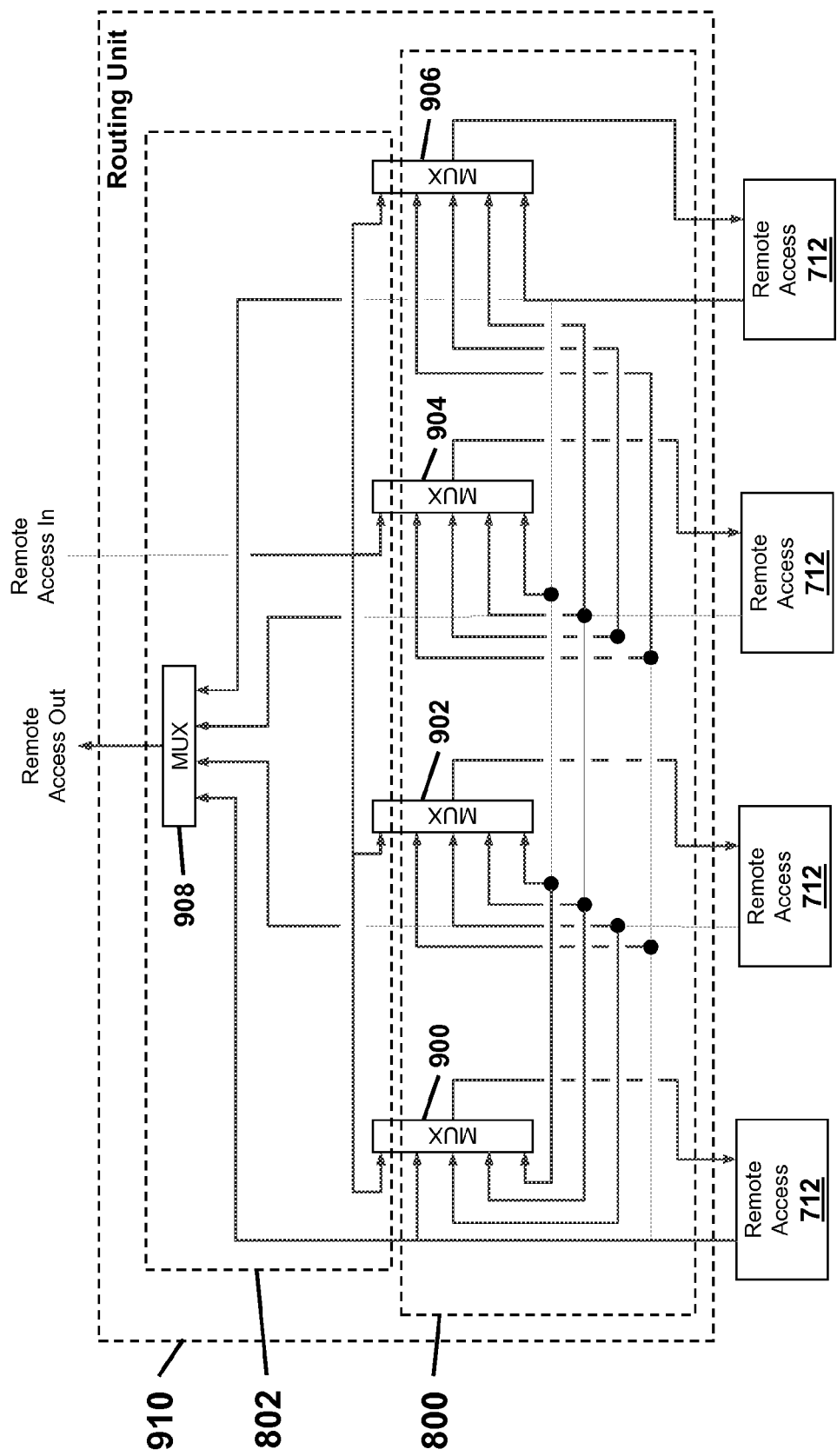
FIG. 9 shows the organization of a tile interconnect routing unit.

The construction of embodiments of the local access interconnect 800 and remote-access logic 802 is detailed in FIG. 9. For clarity, only the remote access logic 712 of each of the interconnected tile processors is shown in FIG. 9. The local access interconnect is implemented by multiplexers (MUXs) 900-906, particularly by the first four inputs labeled 800 for each MUX. As can be seen in the figure, this fully couples a request or response from any tile processor to any other tile processor in the group. The remote access interconnect 802 is implemented by MUX 908, which couples an outgoing non-local request or response to the non-local tile interconnect, and by the fifth input to MUXs 900-906, which couples an incoming non-local request or response from the non-local tile interconnect to the destination processor in the local group. Together, MUXs 900-908 constitute a routing unit 910, which can route 4 local requests and one non-local request in a cycle. In the embodiment of FIGS. 8 and 9, the four tile processors in the local group of FIG. 8 correspond to the four inputs of remote access multiplexer 908 in FIG. 9.

Figure 10:
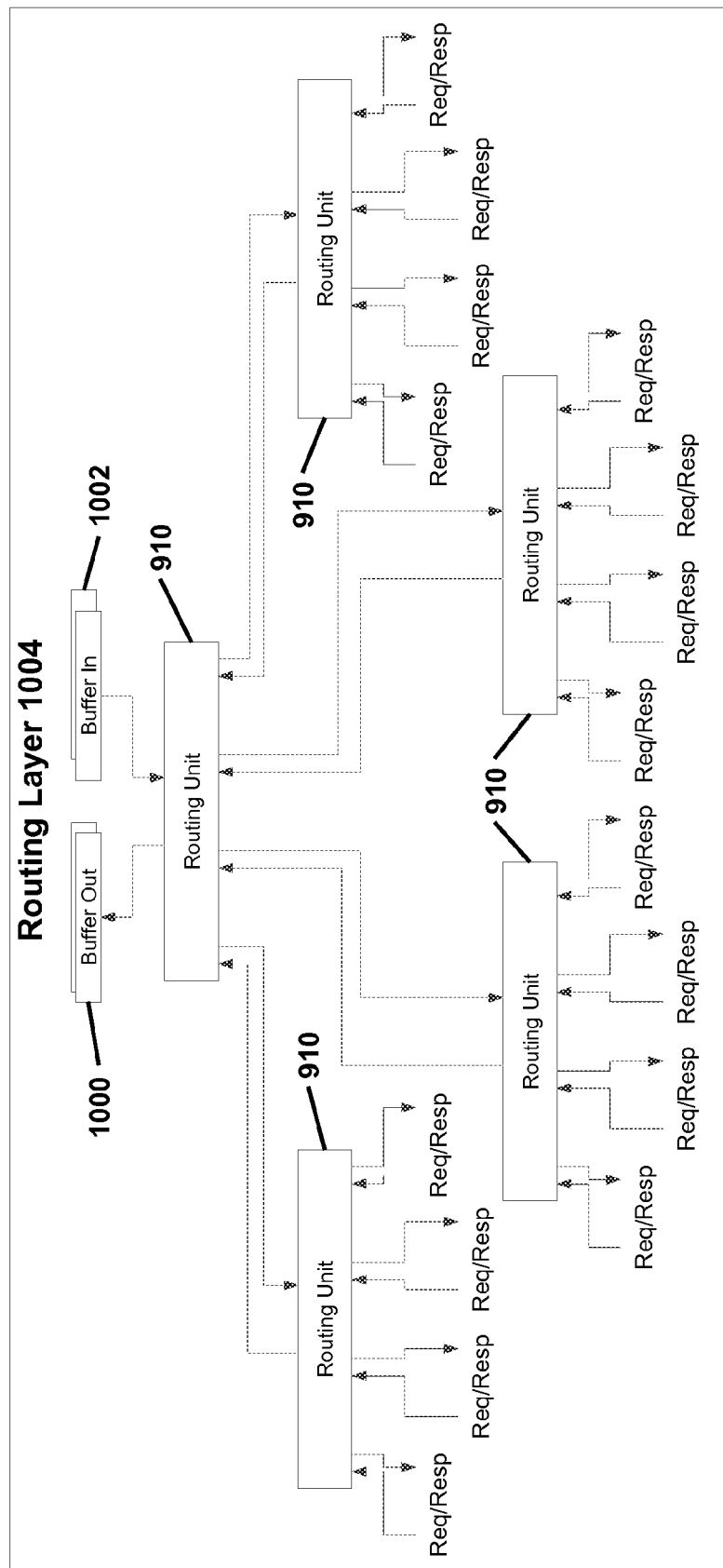
FIG. 10 shows the organization of routing units into routing layers.

Continuing in FIG. 10 with the embodiment of FIGS. 8 and 9, routing units 910 are combined hierarchically into a routing layer 1004. The routing layer includes 5 identical instances of routing unit 910, with 4 instances routing local and non-local accesses (requests or responses) as shown in FIG. 9, referred to as a routing level, and a fifth instance routing the 4 non-local accesses from the first 4 instances, referred to as a next routing level. This next level, in turn, can couple accesses from the first level to another of the routing units at the first level, analogous to a local request, or can determine that the access should be coupled to some higher routing layer. These non-local accesses at the next layer are placed in access buffers 1000 and 1002: buffer 1000 buffers outgoing accesses, and buffer 1002 buffers incoming accesses. Registers 1000 and 1002 are double-buffered, analogous to I-Buffer registers 700 shown in FIG. 7, so that stalls need only be propagated one more level rather than globally.

As illustrated by FIG. 10, the configuration of routing layer 1004 can route 16 accesses local to the routing layer, and one access non-local to the routing layer, in a single cycle. Although it might seem that the non-local bandwidth is insufficient given so many possible local accesses, it should be appreciated that, because of the I-Buffer registers 700, tile processors execute the corresponding access instructions offset by a cycle, and so present their accesses to the routing level one at a time. The demand for access routes is therefore evenly distributed in time.

Figure 11:
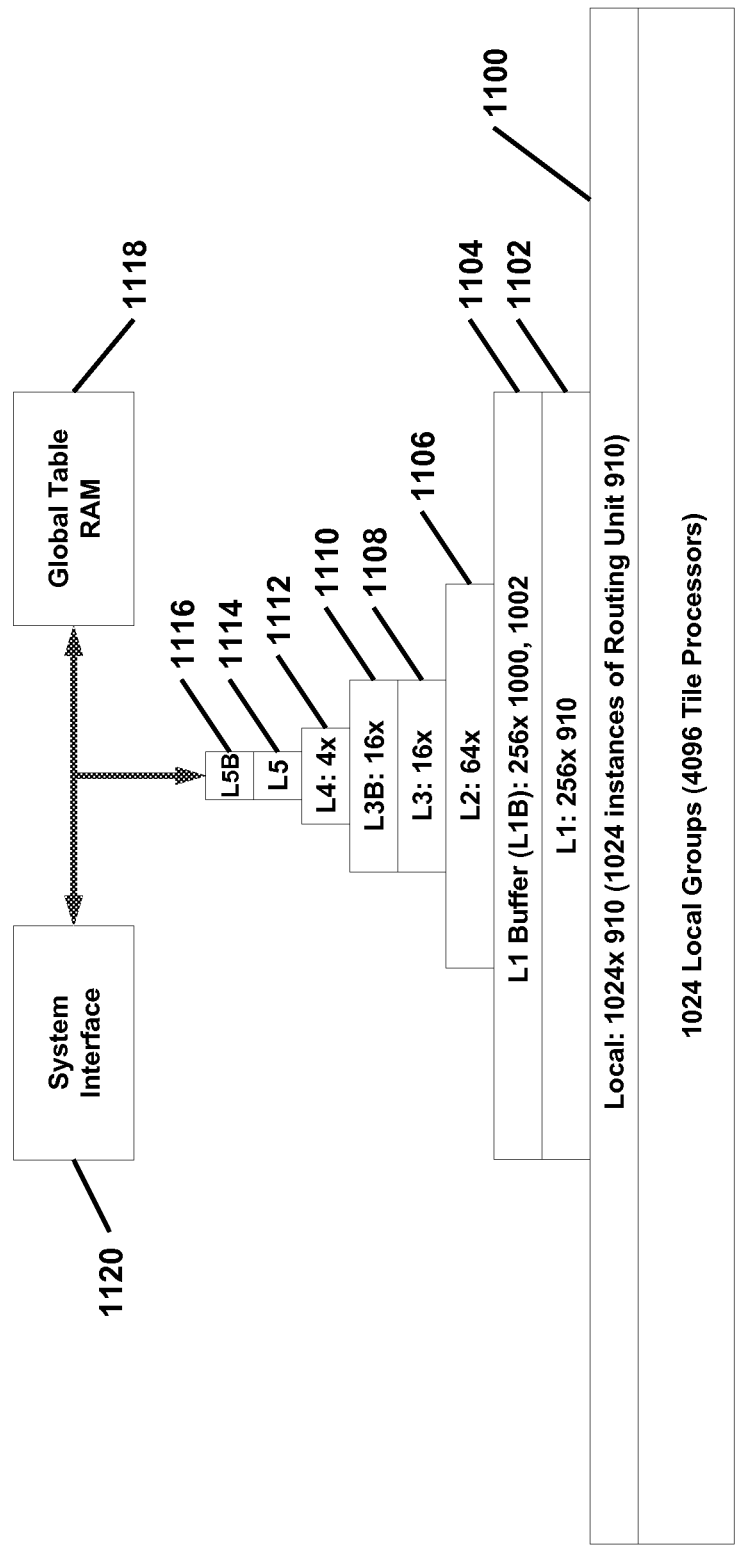
FIG. 11 shows the tile interconnect routing hierarchy.

FIG. 11 illustrates how routing units 910 in the embodiment of FIGS. 8-10 are structured to implement fully-coupled access between any pair of tile processors. The combination of local interconnect 1100, level 1 interconnect 1102, and level 1 access buffer 1104 includes 256 instances of the routing layer 1004. This includes 1024 instances ("1024×") of routing unit 910 for the local routing, 256 instances ("256×") of routing unit 910 for the level 1 interconnect, and 256 instances of access buffers 1000 and 1002 for non-local accesses to and from the level 1 interconnect. Correspondingly, the combination of level 2 interconnect 1106, level 3 interconnect 1108, and the level 3 access buffer 1110 includes 16 instances of routing layer 1004, with the number of instances of routing unit 910 (for interconnects 1106 and 1108) and access buffers 1000 and 1002 (for buffer 1110) shown in the figure. The top level, combining level 4 interconnect 1112, level 5 interconnect 1114, and level 5 access buffer 1116, includes a single instance of routing unit 1004. A non-local request at level 5 is directed either to system interface 1120 for coupling data to the rest of the system, or to global table random-access memory (RAM) 1118 for coupling data in tables that are shared by all tile processors. This RAM 1118 stores global parameters, lookup tables, and histograms for recording the frequency of various data values, for example to record the overall brightness of an image.

It should be understood that FIGS. 8-11 illustrate just one embodiment of the hierarchical interconnect routing configuration used by the two-dimensional data processing systems described herein. The routing configuration is hierarchical and multiplexer-based, so that a particular tile processor can be selected using a tile processor index having an appropriate number of bits, as discussed further below. Details such as the number of interconnect levels employed and size of the multiplexers (i.e., number of multiplexer inputs), however, may be varied by one of skill in the art based on cost and/or performance requirements of a particular application. Other modifications and enhancements may also be employed by one of ordinary skill in the art. For example, multiple copies of routing units and/or buffers may be included at selected points in the routing configuration, to widen datapaths and reduce contention.

As should be understood from the exemplary embodiment of FIG. 11, the tile interconnect comprised of routing and buffering units 1100-1116 implements full coupling of accesses from any tile processor to the DMEM of any other tile processor. Since each routing layer consists of two levels of multiplexing between access buffers, transfers over this interconnect are generally not timing-critical. This interconnect timing tolerance is one component of an implementation that supports distributed visual processing across a large number of tiles. Other components include: 1) a mechanism to address and route accesses across the interconnect; 2) a mechanism to avoid the latency of the interconnect, in number of cycles, from slowing the execution of tile programs; and 3) a coherency mechanism to ensure that accessed data is correct, which requires both that a value is not accessed unless it has been validly computed, and that the value is not overwritten before it is accessed by all processors that require it. These three components are discussed in turn below.

Figure 12:
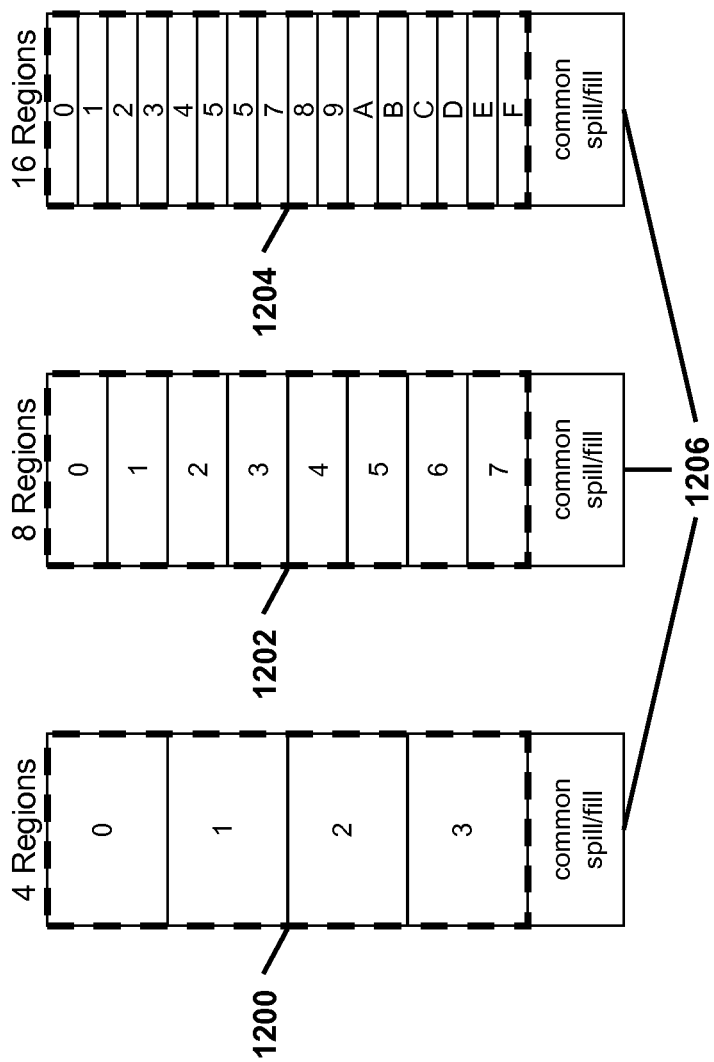
FIG. 12 shows partitioning configurations of data memories within tile processors.

The basis for addressing and routing over the tile interconnect is the partitioning of the DMEM 710 shown in FIG. 7. Three exemplary configurations of this partitioning are shown conceptually in FIG. 12. DMEM 710 is partitioned into regions of identical size, for example using a base address register setting for accesses relative to a given region. Each region contains a vertical set of pixels in a tile (i.e., a column of pixels in a two-dimensional array), and adjacent regions comprise the horizontal dimension of a tile (along a row of a two-dimensional array). Programs operate within a single region at a time, but repeat sequentially through the regions, and therefore horizontally across the tile. The number of regions is a power of two, corresponding to the width of the tile, and in the embodiments of FIG. 12 the regions are numbered sequentially with hexadecimal numbers: configuration 1200 has 4 regions, numbered 0-3; configuration 1202 has 8 regions, numbered 0-7; and configuration 1204 has 16 regions, numbered 0-F. Depending on the memory requirements of the program, there can be additional memory not required to be allocated to regions. This memory can comprise a common spill/fill area 1206 used by all programs for temporary values: this avoids duplicating this memory in all regions.

Figure 13A:
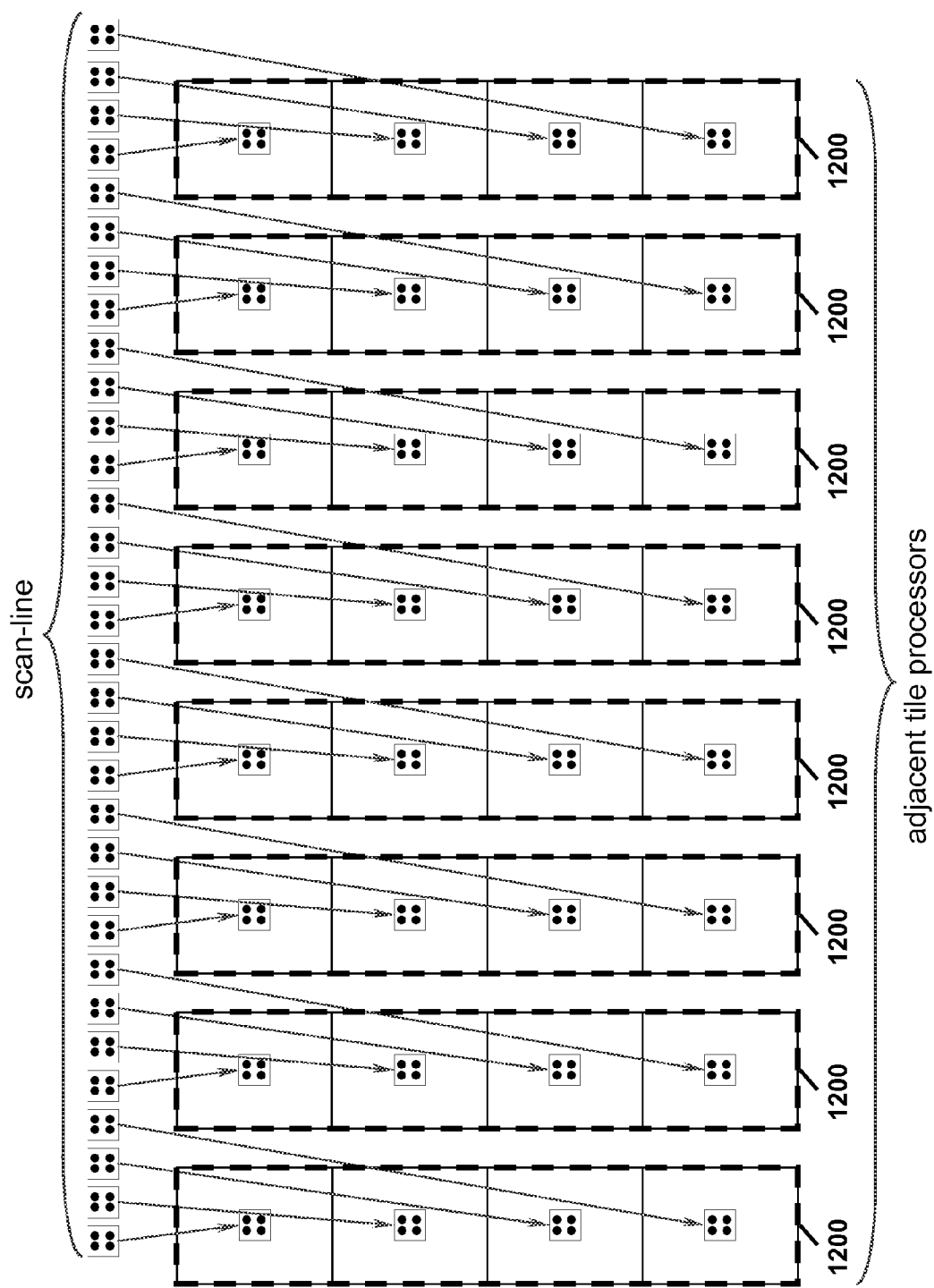
FIG. 13A shows the mapping of a scan-line of pixel data to data memories partitioned into 4 regions.
Figure 15:
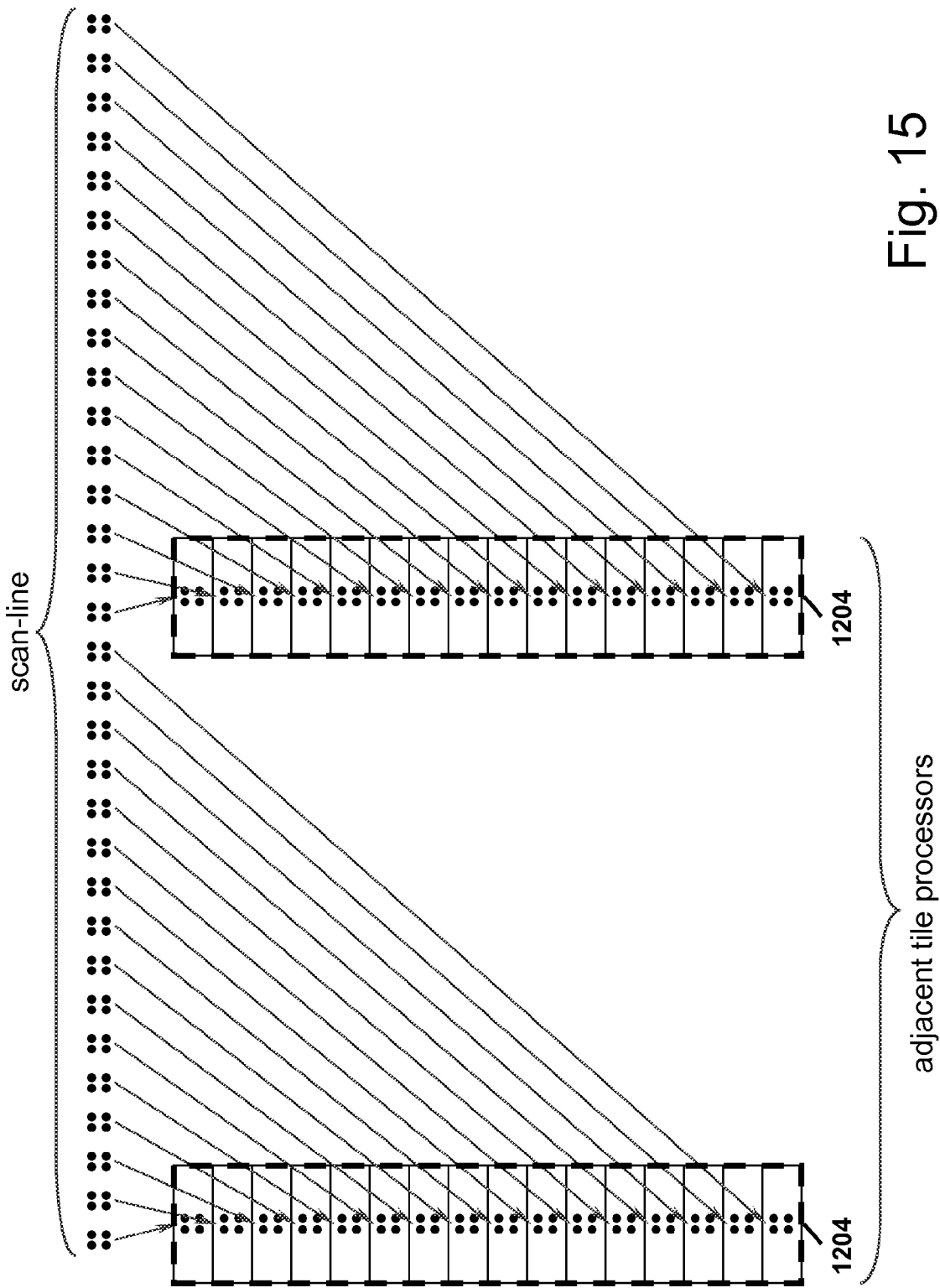
FIG. 15 shows the mapping of a scan-line of pixel data to data memories partitioned into 16 regions.

To clarify the mapping of pixels to regions, FIG. 13A, FIG. 14, and FIG. 15 show the mapping of adjacent pixels in a scan-line to corresponding regions in adjacent tiles for configurations 1200, 1202, and 1204, respectively. A number of pixels in a tile are mapped to the corresponding number of regions, so that the horizontal dimension is partially mapped vertically within DMEM 710 of each tile processor. It should be understood that the vertical dimension of the frame is mapped directly within each region so that, for example, pixels at the same horizontal location, but in the vertical direction, are within the same region. This mapping of two-dimensional pixel data is shown in FIG. 13B. Execution is parallel between pixel tiles, but serial within each tile, as discussed further below.

Creating an access between regions involves two addressing steps, one using an index to specify the horizontal location of a pixel, and a second using an index to specify the vertical location. One skilled in the art will recognize that this form of addressing is performed identically to the addressing used to access two-dimensional arrays in single processors. Conventionally, these two index dimensions are combined into a one-dimensional address, by multiplying one index by one of the two array dimensions (either number of rows or number of columns), and adding the second index. The final result is added to a base address for the array. The reason for this is that the two-dimensional array is allocated to a sequential set of addresses in a linear memory. By contrast, in the processors described herein, these address components remain separate. The horizontal index locates a tile and a column location within the tile, corresponding to a region, and the vertical index locates a memory location within the region, relative to the base address of the region and the location of the pixel values within the region.

Figure 16A:
FIGS. 16A, 16B, 16C, 16D, and 16E shows how the tile interconnect routing is determined.
Figure 16B:
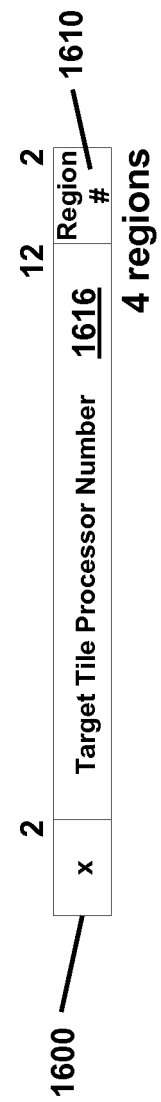
Figure 16C:
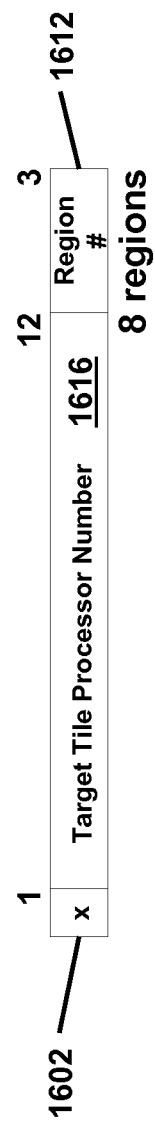
Figure 16D:
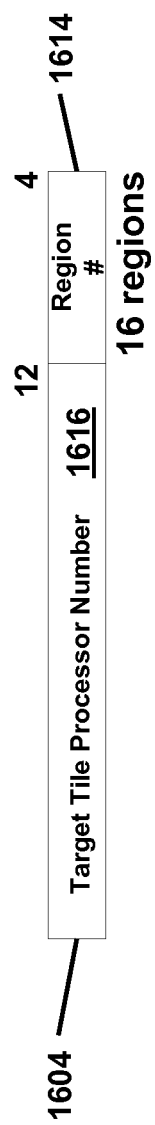
Figure 16E:
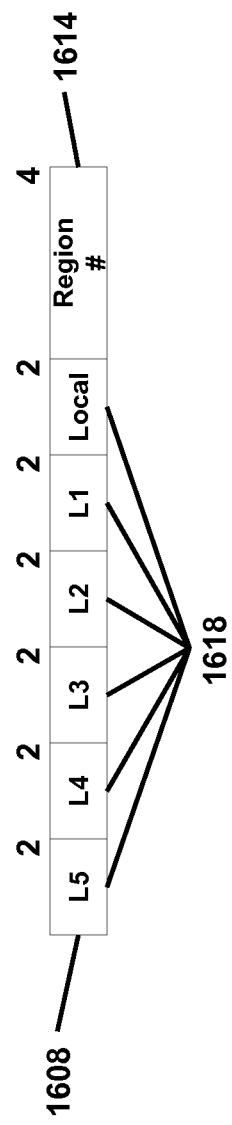

The horizontal index alone is used to route accesses over the tile interconnect. FIGS. 16A, 16B, 16C, 16D, and 16E provide examples of how this index is interpreted to perform this routing in the case of the routing configuration embodiment of FIGS. 8-11. In FIG. 16A, the horizontal, or column, index is represented by 16-bit value 1606. This value is interpreted as shown by index 1600 in FIG. 16B, index 1602 in FIG. 16C, or index 1604 in FIG. 16D, depending on whether the region configuration is 1200, 1202, or 1204 in FIG. 12, respectively. In each case, a number of least-significant bits is used to select a region number, with the number of bits being sufficient to select all regions configured: 2, 3, or 4 bits for 4, 8, or 16 regions respectively. Region index 1610 in FIG. 16B therefore has 2 bits, region index 1612 in FIG. 16C has 3 bits, and region index 1614 in FIG. 16D has 4 bits.

The next 12 more-significant bits in each horizontal index form target processor index 1616. Target processor index 1616 identifies one of the 4096 tile processors connected by the routing configuration of FIGS. 8-11, since adjacent tile processors correspond to adjacent tiles of pixels (this can result in one or two bits in the horizontal index being unused, as shown for horizontal indexes 1600 and 1602). For example, the leftmost tile in a frame corresponds to tile processor 0, the next tile to tile processor 1, and so on. These 12 bits form the target tile processor number, and directly determine the route of an access over the tile interconnect, as shown by the breakdown of this field for horizontal index 1608 in FIG. 16E. Target processor index 1616 includes six 2-bit routing level fields 1618 corresponding to routing levels, with higher significance bits corresponding to higher routing levels, labeled "local," "L1," etc. in the figure. At any level, the 2-bit field 1618 forms the MUX selects for the local access interconnect, corresponding to MUX inputs 800 for MUXs 900-906 in FIG. 9. Two-bit fields are sufficient for addressing the four inputs of MUXs 900-906, but more bits would be required for embodiments using larger multiplexers. The more significant bits, relative to any 2-bit field 1618, are used to decode, in remote access logic 802 shown in FIGS. 8 and 9, whether the access is local or non-local. For example, the first four tiles from the leftmost position have zeros in all fields L1-L5. If any of these fields is non-zero, the access is non-local to this group: in this case, the L1 field is used by the level 1 routing for its local access interconnect, if the access is within its hierarchy, as determined by fields L2-L5 having zero values. If any of the fields L2-L5 is non-zero, the access is non-local to level 1, and it is presented to the level 1 access buffer 1000 shown in FIG. 10.

It should be understood that this process continues, using successively higher-order fields of the target tile processor number, to route accesses throughout the hierarchy shown in FIG. 11, up to and including level 5 interconnect 1114. At this level, the type of instruction that initiated the access is used to distinguish an access that is local to level 5, which is identified by an access to any other tile processor, or that is non-local to level 5, which is identified by an access to the global table RAM 1118 or system interface 1120. This indication of instruction type is implemented through a separate signal from the horizontal index, using any of the signaling methods known to those of ordinary skill in the art of processor design.

Returning to the case of tile processor access requests, once the target tile processor index is routed to the interconnect level having a routing unit that can access the target tile processor, no more decoding is required for the access request, and the bits in the routing level fields function as inputs to the multiplexer at the corresponding routing level. In this manner, access requests are routed from higher levels to lower levels of the hierarchy. For example, a local route at level 5 uses the "L5" bits in horizontal index 1608 to form the MUX selects corresponding to MUX inputs 800 for MUXs 900-906 in FIG. 9 (with the understanding that this routing unit 910 is the routing unit for level 5 instead of for a local group as shown in the figure). This couples the access to the level 4 routing unit as a remote access input, and at that point the "L4" bits in 1608 select which one of the MUX inputs, corresponding to the remote access inputs in remote access logic 802 in FIG. 9, are selected to level 3. This couples the access to the selected incoming access buffer 1002, shown in FIG. 10, for level 3, which is one of the 16 instances of access buffer 1110 in FIG. 11. At that point, the process continues using successively lower-order fields of the target tile processor number, to route accesses throughout the hierarchy to the ultimate destination tile processor. At that tile processor, the region number selects the base address for the access, which is added to the vertical index of the access to access data in DMEM. Store accesses write data accompanying the access into the DMEM. Load accesses are accompanied by a return index, identifying the tile processor and region that performed the access. The addressed data is read from DMEM, and returned to the source of the access, using the routing process just described. Data received at the source of the access is written into banked register file 708, shown in FIG. 7, specifically into the register identified by the original load instruction, and into a specific register bank associated with the source region. The banked register file includes an identical set of registers for each region, used independently by region, so the load data is written into a register unique to that region.

Having described the tile interconnect addressing and routing mechanism, and turning now to the performance issues raised by the latency of load accesses over this interconnect, it will be obvious to one skilled in the art that the number of cycles taken for the access request to traverse the tile interconnect, in addition to the number of cycles taken for the data response to traverse the tile interconnect, is much greater than that of a conventional load, which is typically one cycle. These cycles delay the execution of any instruction that requires the data accessed by the load, by approximately the same number of cycles. Because these loads are relatively frequent, likely on the order of 20% of all instructions, an additional 5 cycles would double the number of cycles taken by the program. This represents a significant degradation, avoided in the systems described herein by introducing a novel form of instruction sequencing that places a wide separation in time between a load instruction and any subsequent instruction that depends on data accessed by the load operation.

Figure 17A:
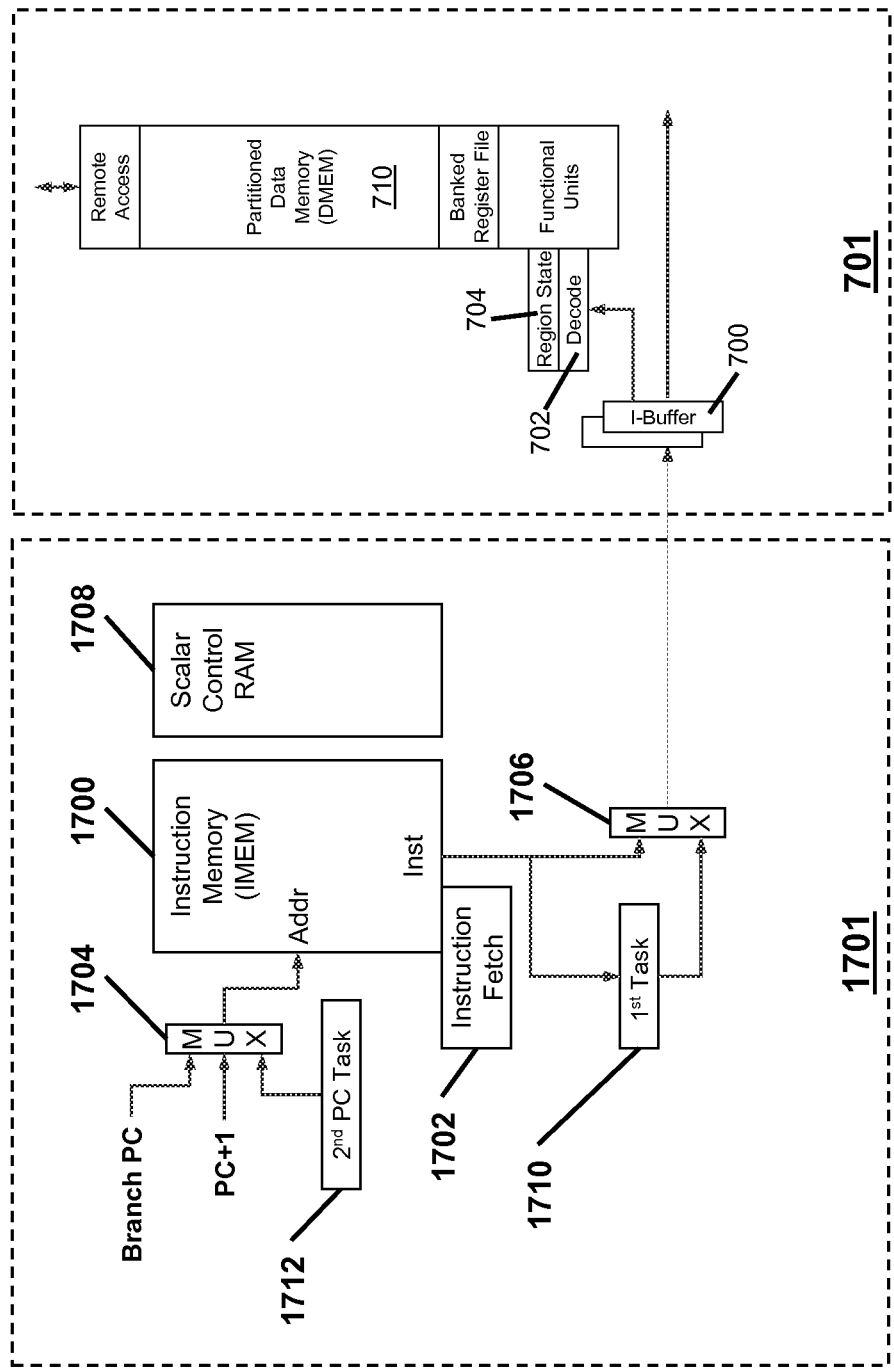
FIG. 17A shows the organization of the master tile processor.
Figure 17B:
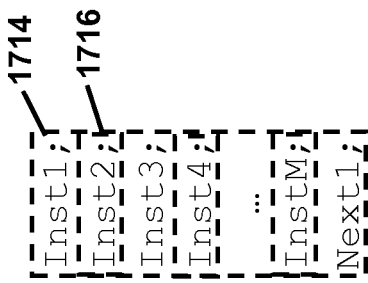
FIG. 17B shows an exemplary task interval executed by the processor described herein.

This instruction sequencing is implemented by a master tile processor 1701, shown in FIG. 17A connected to a first instance of tile processor 701. The first of tile processors 701 is in turn connected to the next tile processor, in the manner shown in FIG. 8, and continuing through the entirety of the interconnected tile processor group. For the routing configuration shown in FIGS. 8-11, this would include up to 4096 tile processors in all. A sequence of instructions executed by master tile processor 1701, called a task interval, is shown in FIG. 17B. The un-numbered components of tile processor 701 are the same as for other tile processors shown in FIG. 7; numbered components are unique to the master tile processor. These include: instruction memory (IMEM) 1700, instruction fetch logic 1702, program counter (PC) MUX 1704, instruction MUX 1706, a register for storing a first task instruction 1710, and a register for storing the PC of a second task instruction 1712.

In the task interval instruction sequence of FIG. 17B, the first task instruction 1714 is to be loaded into first task instruction register 1710. The program counter value for second task instruction 1716 is for loading into second PC task instruction register 1712. Instruction execution by master tile processor 1701 and its associated tile processor array is described in more detail in connection with the flowcharts of FIGS. 17C and 17D.

Figure 17C:
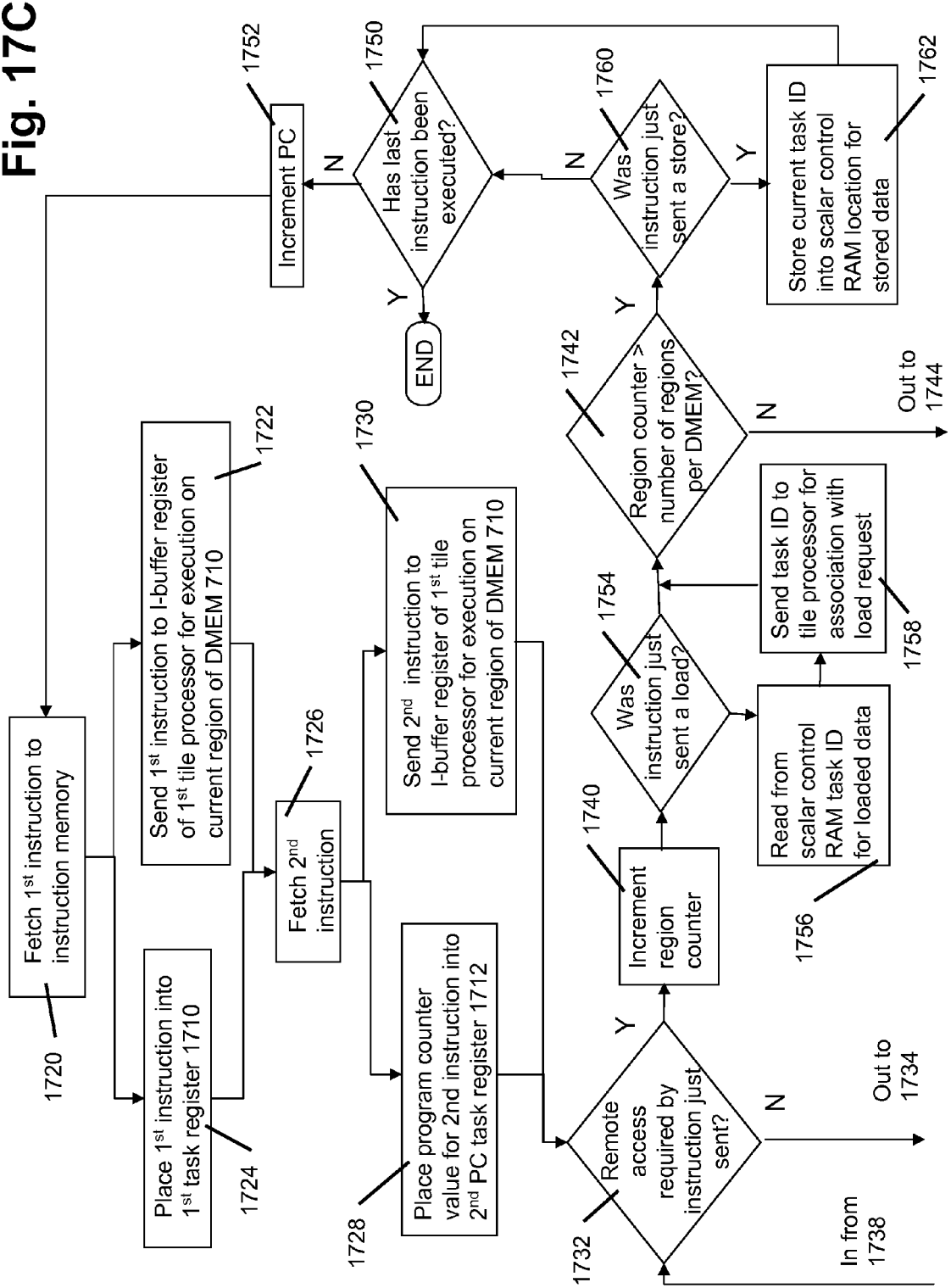
FIGS. 17C and 17D illustrate a method of program execution by the master tile processor.
Figure 17D:
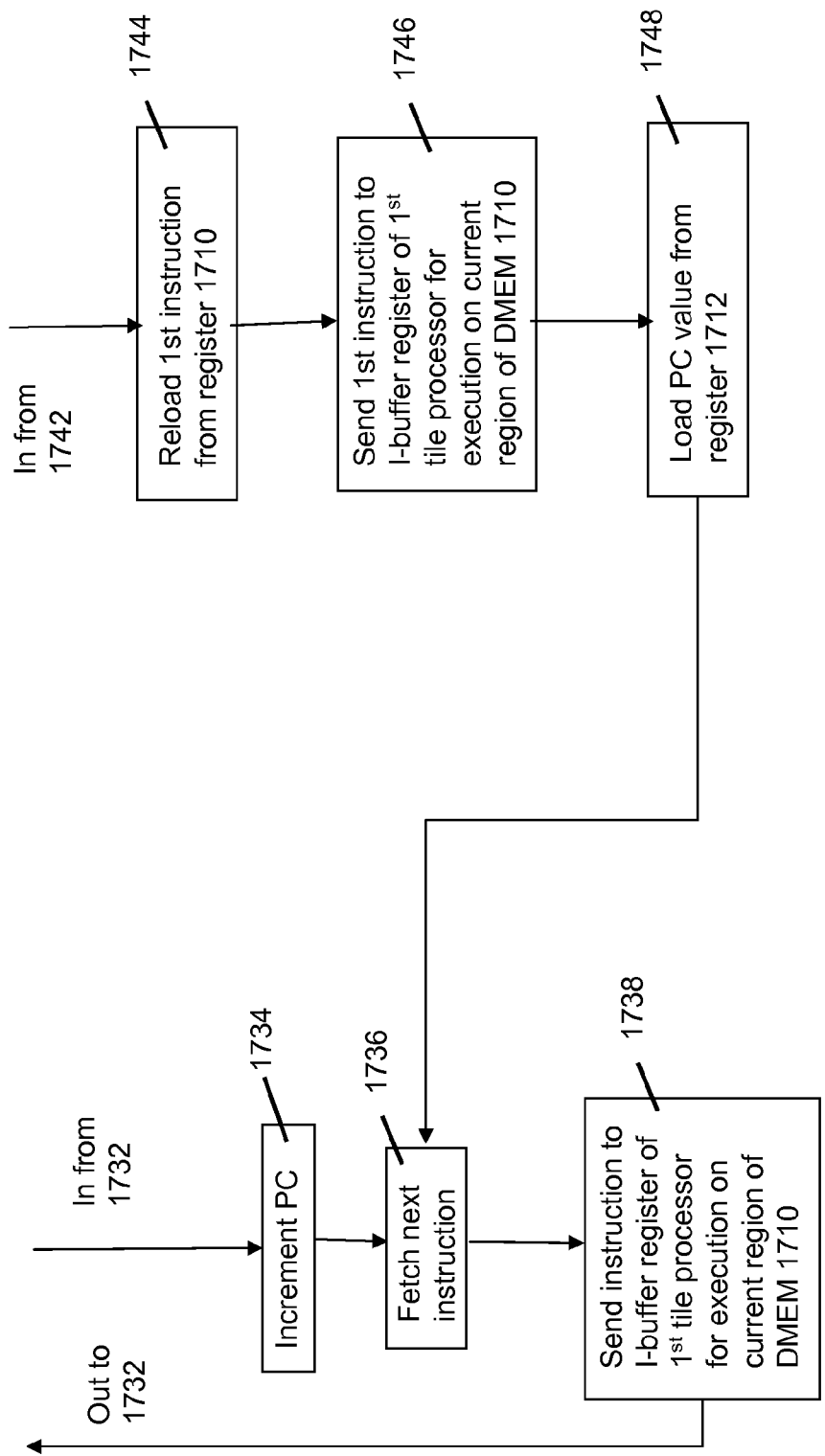

The flowchart of FIGS. 17C and 17D illustrates an embodiment of a process of program execution by master tile processor 1701. To begin a program, the instruction fetch logic 1702 fetches the first instruction of the program (step 1720 in FIG. 17C), selecting the "Branch PC" input to MUX 1704 and applying the address of the first instruction (this is conventional operation for any processor). The instruction MUX 1706 selects the instruction accessed from IMEM 1700 to the I-Buffer register of the first tile processor (step 1722 of FIG. 17C), where it is decoded and executed. Execution by the tile processors 701 is described in more detail below in connection with the flowchart of FIG. 17E. At the same time the instruction is decoded, it is also conveyed to the I-Buffer of the next adjacent tile processor, which in turn decodes it and also conveys it to the next adjacent processor. In this manner, all tile processors execute the same sequence of instructions, but offset by a cycle in each successive tile processor.

When this first instruction is placed into the I-Buffer, it is placed at the same time into the first task instruction register 1710 (step 1724 of FIG. 17C). On the next cycle, the instruction fetch logic 1702 selects the next incremental PC, "PC+1," at PC MUX 1704, accessing the next sequential instruction (step 1726 of FIG. 17C) while the first is decoded and conveyed to the adjacent tile processor. At the end of this cycle, the value for "PC+1" is placed into the second task instruction PC register 1712 (step 1728 of FIG. 17C). The second instruction is also sent to the I-Buffer register of the first tile processor for execution (step 1730 of FIG. 17C). The combination of the instruction stored in register 1710 and the PC stored in register 1712 permits the instruction fetch logic 1702 to restart the execution of the task interval by selecting register 1710 at MUX 1706 into the I-Buffer and, on the next cycle, selecting register 1712 as the PC for the next instruction to be fetched.

The end of a task interval is defined by an instruction that requires a remote access that is intended to be performed using the tile interconnect, including accesses between regions, and system and table accesses at level 5. This is indicated as "Inst M" in FIG. 17B. The master tile processor detects such instructions during the decode cycle (decision block 1732 of FIG. 17C), and, if such an instruction is detected ("yes" result of block 1732), this is indicated to the instruction fetch logic, causing it to select register 1710 as the next instruction, which restarts the task interval with the first instruction. This corresponds to steps 1744 and 1746 of the portion of the flowchart shown in FIG. 17D, On the next cycle, register 1712 is used to access the second instruction in the task interval (step 1748 of FIG. 17D), and from that point execution is sequential until execution again reaches the final instruction in the interval, at which point the task interval is executed again. This execution corresponds to the "no" branch of decision block 1732 in FIG. 17C, including steps 1734, 1736, and 1738 of FIG. 17D.

Each repeated task interval is distinguished by being executed using a different set of data, using a unique region of DMEM and a unique bank of registers in the register file, starting with region 0 and progressing with sequentially numbered regions. In the embodiment of FIGS. 17C and 17D, this execution over sequential regions is effected by incrementing a region counter when the end of a task interval is reached (step 1740 of FIG. 17C). This effectively iterates the task interval horizontally across the tile, which is required for correct operation because the program must be executed at every horizontal location. This iteration continues until the task interval completes in the highest numbered region in the configuration (decision block 1742 in FIG. 17C). At that point, "PC+1" is selected at MUX 1704 (step 1752 in FIG. 17C) and instruction execution proceeds sequentially at the instruction "Next1." This is the beginning of the next task interval, and the process of setting registers 1710 and 1712 repeats so that this task interval also can be restarted when the end of the interval is detected. This style of instruction sequencing continues to the end of the program ("yes" branch of decision block 1750 in FIG. 17C). Steps 1754 through 1762 in FIG. 17C implement an embodiment of the coherency mechanism discussed further below.

Because the master tile processor determines the instruction sequence for all tile processors, all tile processors execute the same iteration across regions. This iteration over regions lengthens the program execution time, but not in a way that decreases throughput, because the additional cycles are distributed over additional results. For example, iteration over 4 regions produces 4 sets of intermediate results, having the same throughput of a single iteration of the program (4/4=1).

Figure 18A:
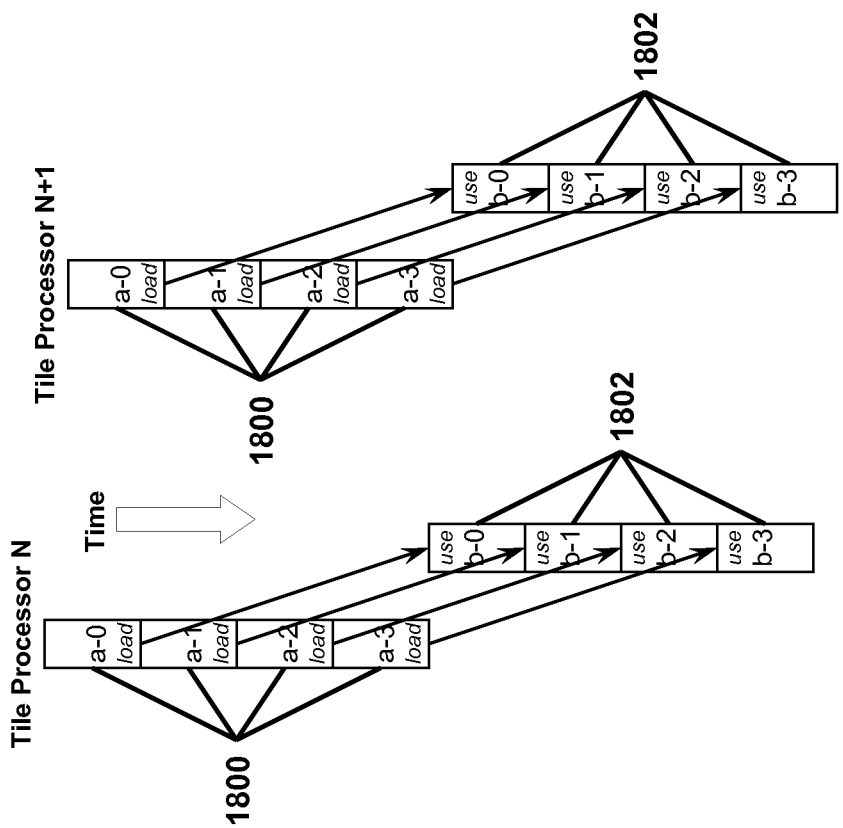
FIGS. 18A and 18B show how instruction sequencing avoids delays due to latency.

However, this iteration has the beneficial effect of widely separating a load over the tile interconnect from a use of the data accessed by the load, as illustrated in FIG. 18A. The figure represents the execution of two task intervals, task interval 1800 ("a") and task interval 1802 ("b"). All intervals 1800 are the same sequence of instructions, as are intervals 1802, and so are numbered the same. As already described, these task intervals are repeated across all regions (4 regions in this example), and across two adjacent tile processors "N" and "N+1," with time progressing vertically in the figure. Execution of the task interval in different regions is identified as "a-0" through "a-4" and "b-0" through "b-3," representing execution in regions 0-3 in each tile processor. Execution of the same task interval in adjacent tile processors is offset by one cycle due to the distribution of instructions via I-Buffers 700, FIG. 7. Task interval 1800 ends with a remote load ("load") that defines the end of a task interval. Task interval 1802 begins with an instruction that uses the data loaded ("use").

Figure 18B:
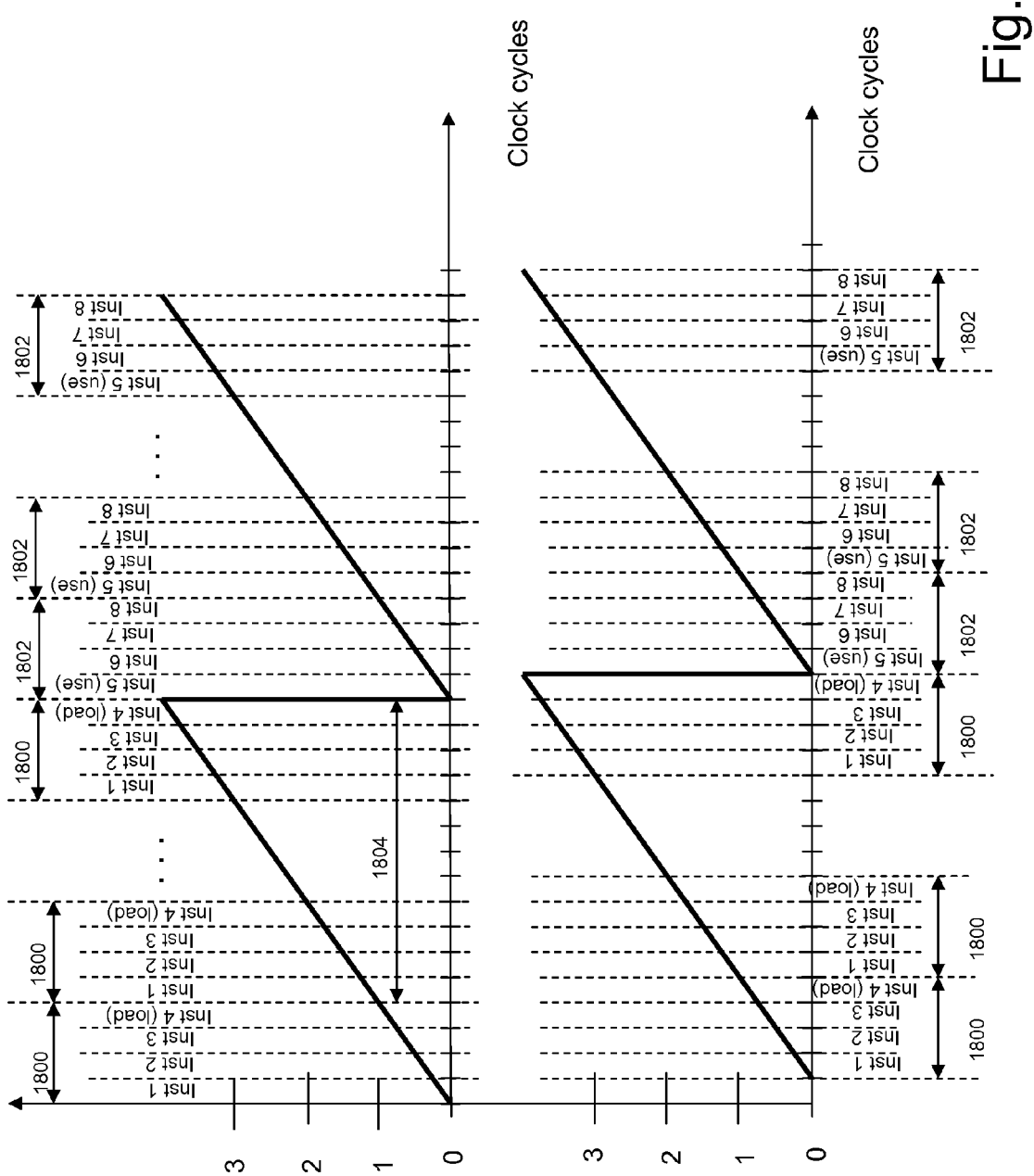

FIG. 18A provides a spatial representation of adjacent tile processors and their respective data memory regions. A time-based representation of the same instruction executions, as shown in FIG. 18B, may also be helpful. In FIG. 18B, the y-axis shows the region of a tile processor's data memory that instructions are being executed in, while the x-axis shows clock cycles. The upper plot is for a tile processor N, and the lower plot for an adjacent tile processor N+1. The plotted diagonal line represents moving through a task interval 1800 of 4 instructions while acting upon the appropriate data in region 0 of the data memory of the tile processor, then executing the same set of instructions in regions 1, 2, and 3 of the data memory sequentially. When the "load' instruction at the end of task interval 1800 is executed in all 4 regions, the next set of instructions (task interval 1802) begins executing back in region 0. The same sequence occurs for tile processor N+1, except that it is one clock cycle behind the execution in tile processor N. FIG. 18B assumes that for this embodiment each instruction requires one clock cycle, and that there are no clock cycles associated with beginning execution in a new region of the data memory, or with beginning execution of a new set of instructions.

The task intervals in the embodiment of FIGS. 18A and 18B are 4 instructions long. Actual task intervals are typically longer, but software optimization can ensure that task intervals have a minimum length, such as 4 instructions long. This is possible because a compiler can determine the types of instructions that end task intervals, and perform code motion optimizations that cause the task interval to contain a desired number of instructions. As can be seen from the figure, use of task intervals at least 4 instructions long separates a remote load from the use by at least 12 cycles (4 cycles in each of 3 other regions). This is illustrated by interval 1804 in FIG. 18B, representing the time between execution of a load instruction in region 0 of tile processor N and use of the loaded data during subsequent instruction execution in the same region. Thus, if the load operation completes in 12 cycles, there is no delay in instruction execution for the instruction that uses this data. It should also be clear that the time available increases with the number of regions, so that, with 8 regions, the load can complete in 28 cycles (4×7), and, with 16 regions, it can complete in 60 cycles (4×15).

Figure 19A:
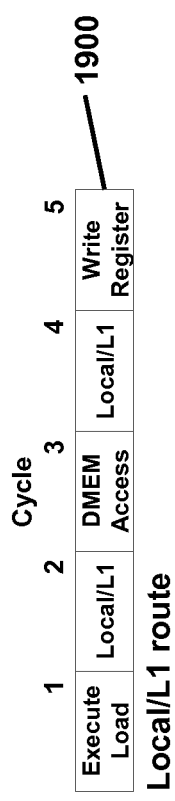
Figure 19B:
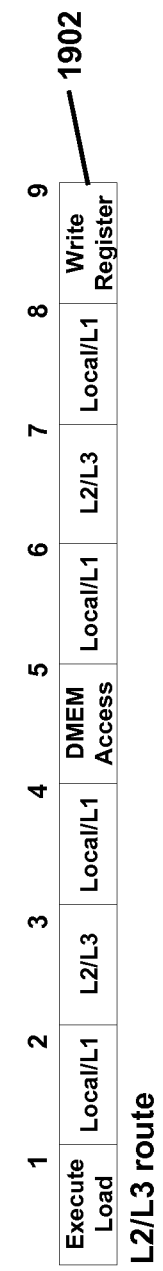

To illustrate that the timing shown in FIG. 18, which represents a worst case minimum in terms of the required access latency for execution of task intervals that are 4 instructions long, is sufficient to prevent remote accesses from delaying program execution, FIG. 19 shows the number of cycles required for various routing paths through the tile interconnect. The number of cycles required depends on the level of interconnect required to perform the routing, including the cycles to route the request to the target tile processor, the cycle to access DMEM at that target, and the cycles to route the data response. FIG. 19A shows the sequence 1900 of cycles needed for an access that can be routed over the local and level 1 interconnect: from the time the load is executed in cycle 1, one cycle is taken for each of the following: local and level 1 request route, DMEM access, local and level 1 response route, and register write. As the register is written, the data can also bypass the register file and be used for execution, so only three intervening instructions are required in cycles 2-4, inclusive, to avoid delaying program execution. Sequence 1902 in FIG. 19B is for an access that can be routed over the level 2 and level 3 interconnect, adding 4 cycles over those required by sequence 1900 to traverse the additional levels, for a total of 7 intervening instructions required to avoid delay.

Sequence 1904 in FIG. 19C is for a global RAM access, which includes routing over level 4 and level 5, also adding 4 cycles over the number in sequence 1900 and requiring 7 intervening instructions. Finally, sequence 1906 in FIG. 19D is for the worst case of needing all levels to route both request and response. This adds 4 cycles over those required by sequence 1902 and requires 11 intervening instructions to avoid delay. Since iteration of task interval execution across tile processor data memory regions provides at least 12 intervening instructions, as can be seen from FIG. 18, and since 11 are required for the operation of FIG. 19D, the access can be performed using the tile interconnect without delaying program execution due to latency even in the worst case. If more regions are used, the timing is less critical, because this provides even more intervening instructions: 28 for 8 regions and 60 for 16 regions.

Turning now to the issue of coherency, it is not sufficient to be able to route accesses over the tile interconnect and to prevent the latency of a load access from delaying program execution. The execution of tile processors is offset by the I-Buffers and by iteration across regions. There must be some mechanism to ensure that data accessed by a load is the data that would be written by the store most recently preceding the load in serial instruction execution, and not some earlier store or a store that follows the load. In other words, the requested data must not only arrive in time to be used in the requesting operation, but it must be the correct data. This hypothetical serial sequence of stores and loads must be effectively reconstructed by a coherency mechanism even though tile execution is not serial.

Figure 20:
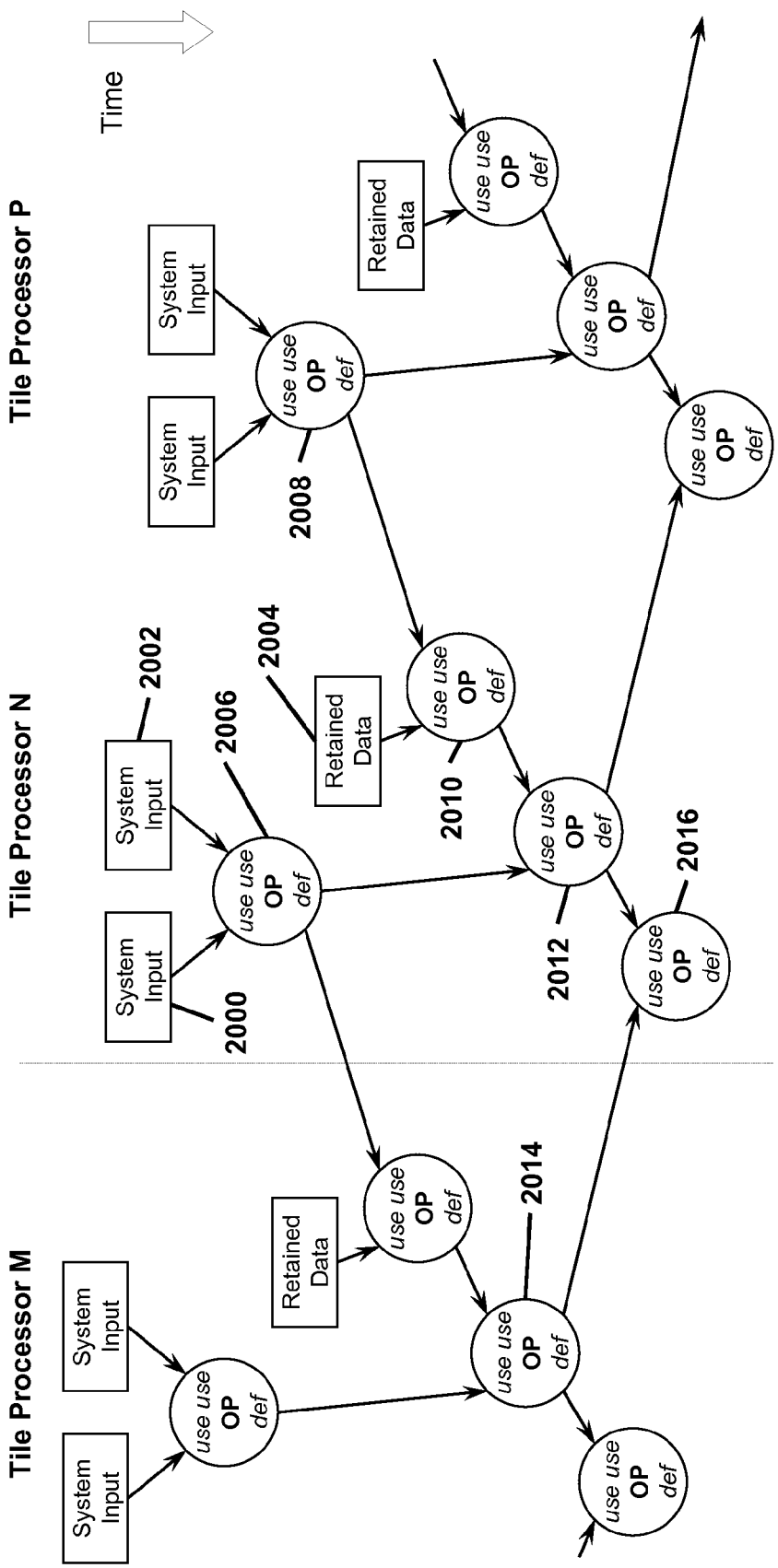
FIG. 20 shows an example of a dependency graph.

The operation of the coherency mechanism can be described by a dependency graph, an example of which is shown in FIG. 20. In the graph, data in memory is represented by blocks 2000-2004: blocks 2000 and 2002 represent data in system memory, and block 2004 represents data retained in the tile processor DMEM. The graph nodes (circles) 2006-2016 represent instruction operations (this is conventional notation for dependency graphs). Instruction inputs are represented by incoming arrows at the top of a node, labeled "use," and output is defined by an outgoing arrow at the bottom of a node, labeled "def" (for "define a value"). An arrow from one node to the next is an arc, and indicates that the result value defined by the outgoing arrow is used as an input operand value for the incoming arrow: the arc defines a dependency between the result and operand values.

All tile processors execute the same instruction sequence, so the dependency graph is the same for all processors: only the data values are different. FIG. 20 shows three tile processors, labeled N, M, and P, which are not necessarily adjacent and can contain data located anywhere along the horizontal dimension of an image frame (or other two-dimensional array). This emphasizes that the dependency graph can cross any span of tile processors, illustrating the nature of the problem to be addressed by the coherency mechanism. Some dependency arcs are local to the tile processor, such as the arcs in tile processor N from node 2006 to 2012, from 2010 to 2012, and from 2012 to 2016. Other arcs are non-local, such as from node 2014 in execution by tile processor M to node 2016 in execution by tile processor N, and from node 2008 in execution by tile processor P to node 2010 in execution by tile processor N. This example focuses on the dependencies of tile processor N for clarity, but it should be understood that all tile processors in the embodiment of FIG. 20 would have dependencies corresponding to those numbered.

An observation essential in understanding the coherency mechanism is to recognize that a defining instruction for a remotely-accessed value occurs within the same task interval for every tile processor and region, because this instruction defines the end of the interval, and every region executes the same instruction sequence. Furthermore, since every task interval sequentially follows a previous task interval, task intervals can be identified using a counter that increases when a task interval has executed in all regions, starting with the value 0 at the beginning of a program. This is referred to as the task ID for the task interval.

Figure 1:
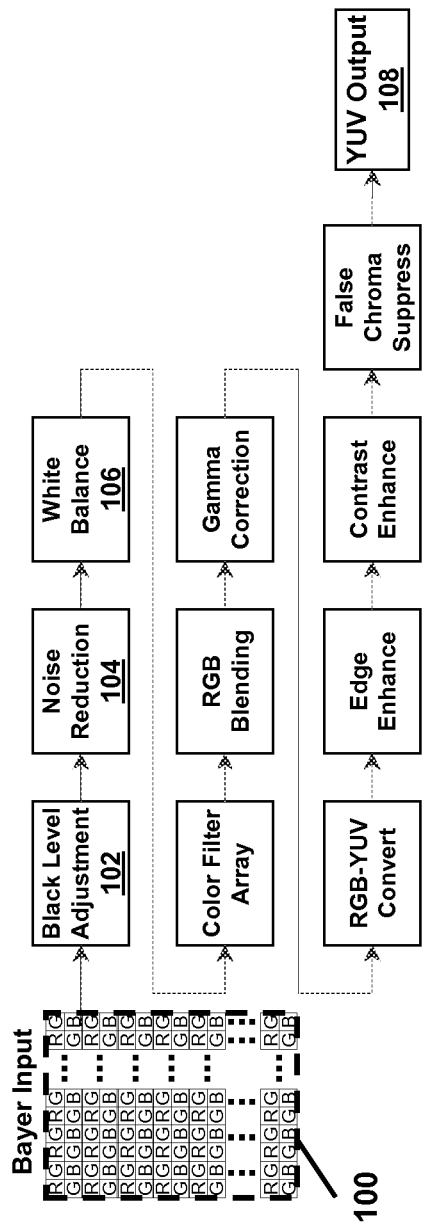
FIG. 1 shows a typical still-image processing pipeline.
Figure 2:
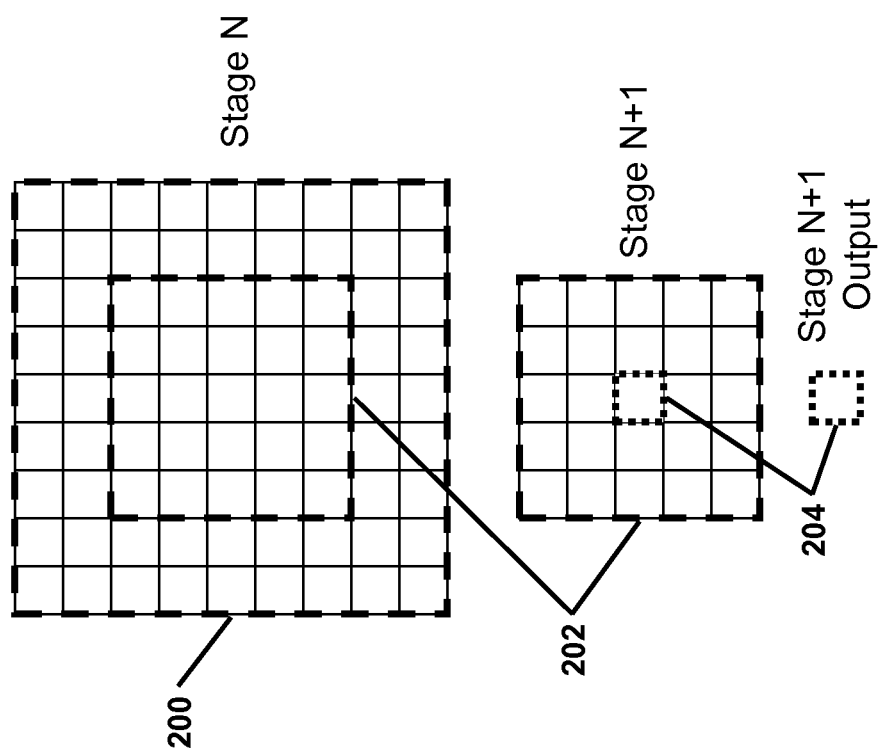
FIG. 2 shows the relative input and output context for image processing.
Figure 3:
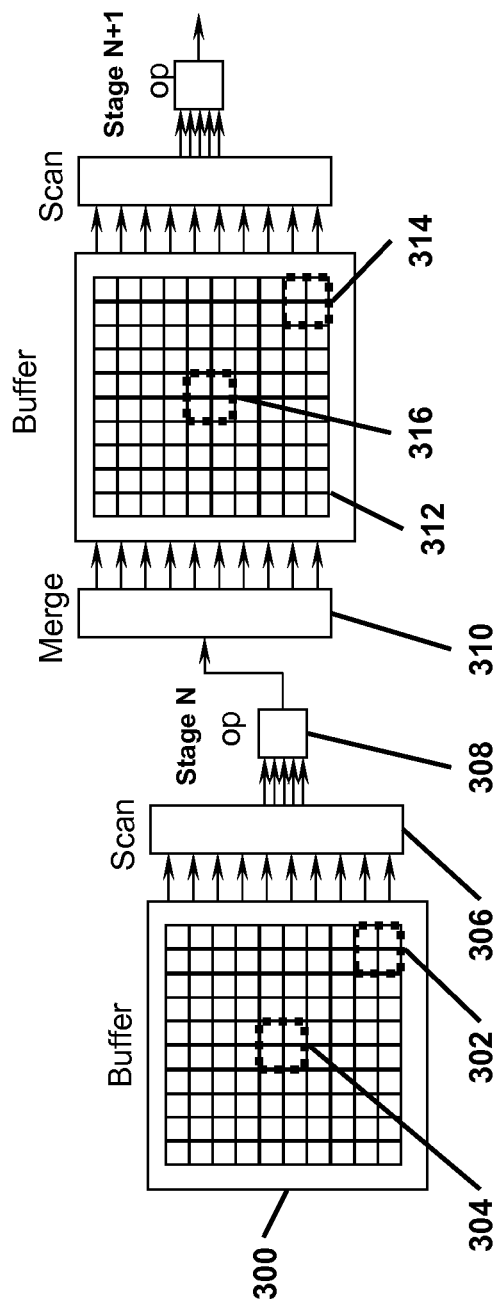
FIG. 3 shows a typical hardware processing pipeline.
Figure 4:
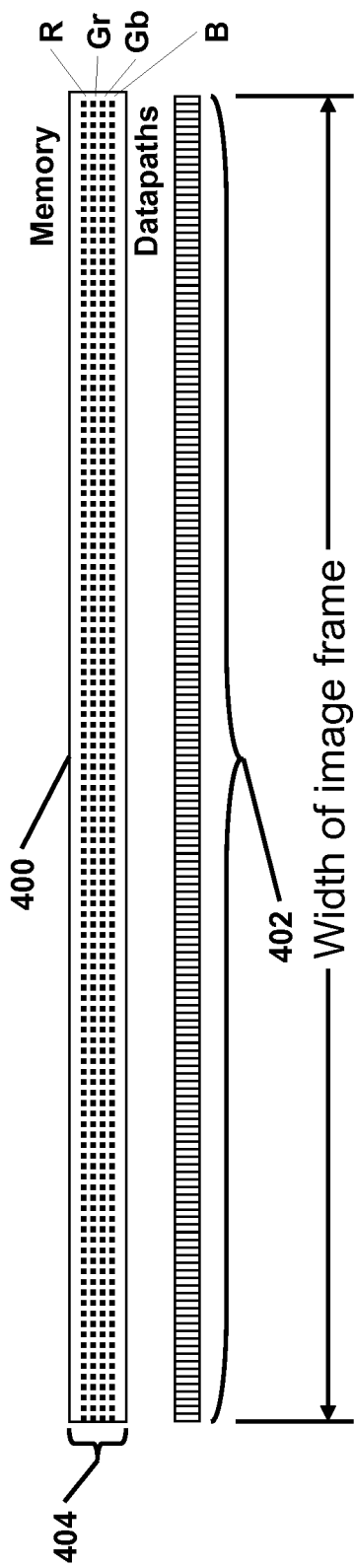
FIG. 4 shows an ideal, but infeasible, programmable solution.
Figure 5:
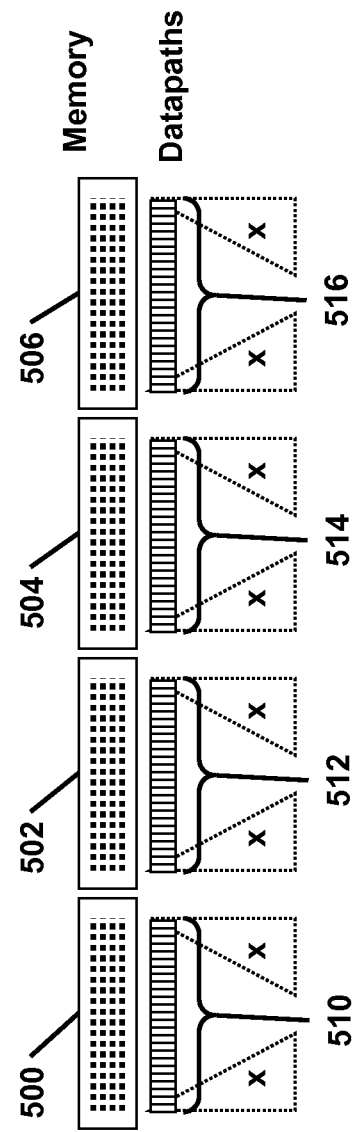
FIG. 5 illustrates the difficulty of parallel visual processing.
Figure 6:
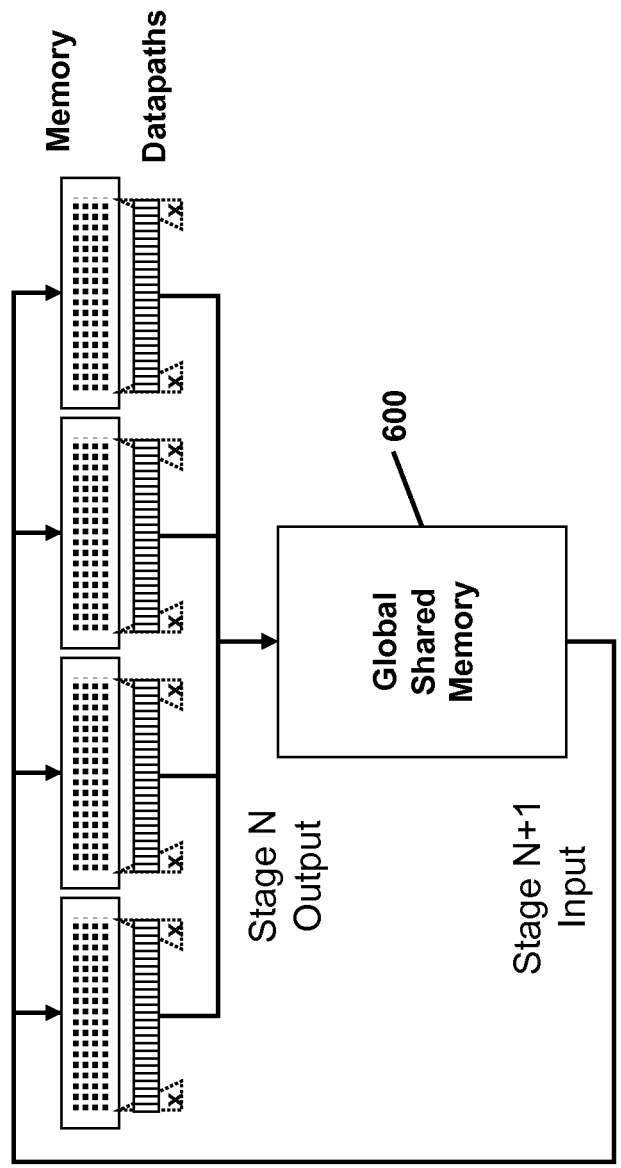
FIG. 6 shows prior-art approaches to parallel visual processing.

Another observation essential in understanding the coherency mechanism is that visual data, since it is shared, has two properties that apply to any shared data, even for the simple case, in a single-processor system, of data shared between the processor and a peripheral device. The first of these properties is that the data is written only once ("write-once") during an iteration of a program, analogous to data being written only once during serial output to a peripheral. Without this property, it would be impossible to share data between iterations, which is required for sharing data in the vertical dimension (since program iteration is in the vertical dimension). For example, if the memory location containing retained data 2004 in FIG. 20 were written twice, only the value of the second write would be preserved for subsequent iterations, and the first cannot be shared correctly with subsequent iterations. This is supported by typical processing pipelines (see, e.g., the process of FIG. 1), because data is buffered between processing stages, and is written by one stage as output and read by another as input. The second property is that shared data is volatile, meaning that data values must be reflected in DMEM and cannot be communicated between instructions via processor registers only, analogous to the requirement that output data to a peripheral must be written to the peripheral.

The write-once property ensures that there is only one value defined in the dependency graph for any number of uses. Furthermore, the volatile property ensures that there is a store in every tile processor and every region corresponding to each defined value, even though the defined values are different. Taken together with the fact that these stores are performed in a uniquely numbered task interval, the following must apply: any arc in the dependency graph can be uniquely identified by task ID, there is one and only one store instruction with this task ID, and every processor has the same task ID for the same corresponding store instruction even though it is executed many times across tile processors and regions.

Turning back to FIG. 17, the master tile processor contains a scalar control RAM 1708 which was not previously described. Also, turning back to FIG. 7, each tile processor contains region state logic 704 which was not previously described. Scalar control RAM 1708 (with associated control logic 1714) and region state logic 704 together implement the coherency protocol. The scalar control RAM contains scalar data associated with visual data (or other two-dimensional data elements). In an embodiment of the system described herein, the visual data is represented by objects in the C++ programming language, and these objects contain both scalar information, such as the dimensions of the object and addressing variables, as well as vector information that is the visual data representing pixels and related data. Scalar information is contained only in the scalar control RAM of the master tile processor; vector information is distributed across the DMEM of the tile processors. The relationship between the two is that the scalar data includes an address pointer to the visual data, in the DMEM of all regions, representing an offset from the base address of each region.

This provides a mechanism for associating stores, which define values in the dependency graph, with loads that use these values. When a visual object is written by a store, this store is first performed in region 0 of the first tile processor. Concurrently with writing the visual vector data (which is a scalar in this region, one of many values in the vector), the master tile processor writes a task ID variable of the object in the scalar control RAM 1708: this variable is unique to each instance of an object, and records the task ID of the task interval that performs the store to the object. Because the store will be executed in all regions of the DMEM before execution of any subsequent instruction using the stored data, this writing of the task ID can be performed just once, after the store is executed in the final region of the DMEM. This process is shown by steps 1760 and 1762 in the embodiment of FIG. 17C. When a visual object is read by a load, the master tile processor reads this task ID variable, and associates it with the load instruction that is distributed to all tile processors and executed in all regions. This association of a load instruction with its task ID is done for each remote load instruction, as implemented by steps 1754 through 1758 in the embodiment of FIG. 17C.

Figure 17E:
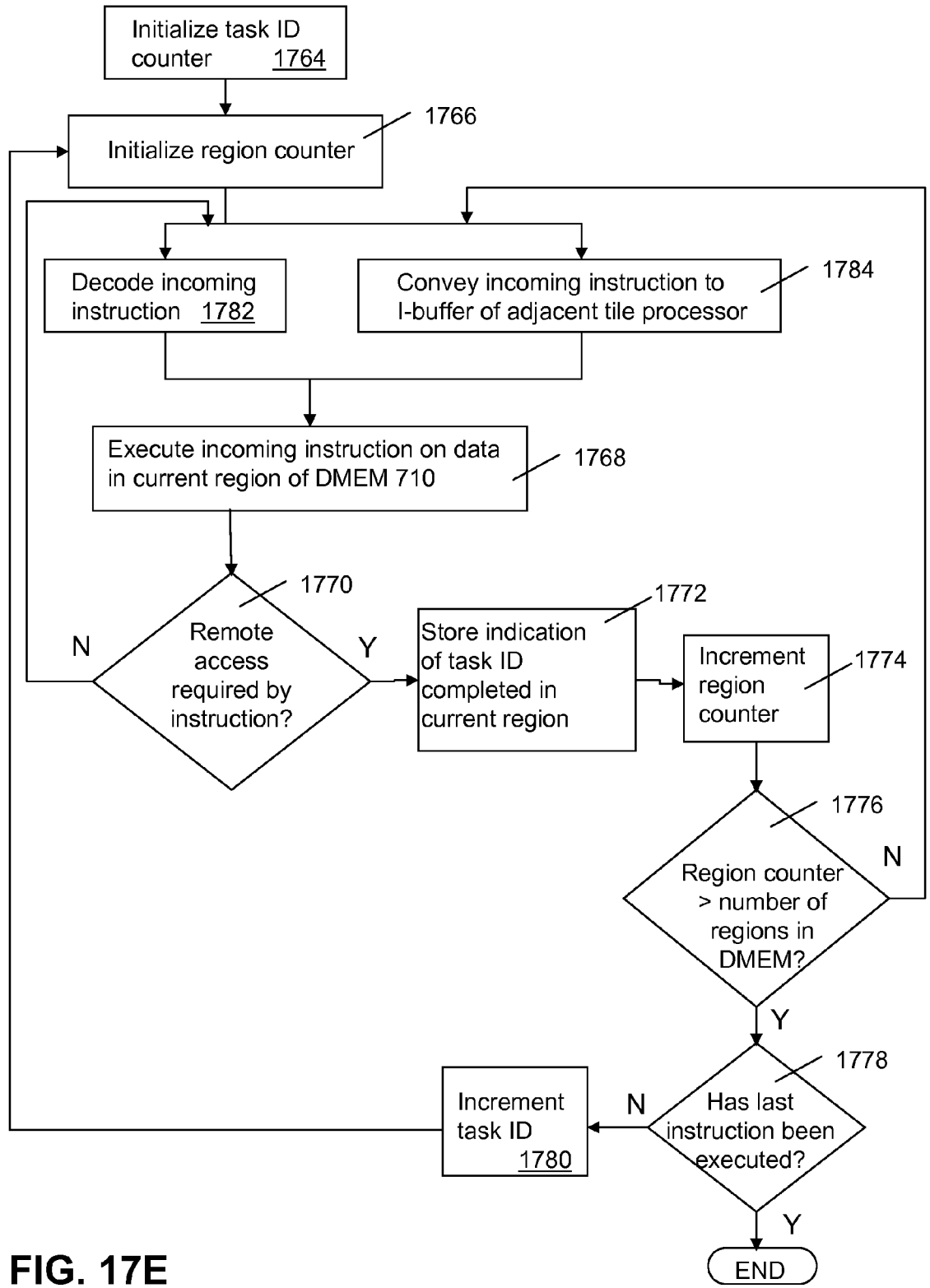
FIG. 17E illustrates a method of program execution by a tile processor.

In the tile processors, the region state logic 704 maintains two values: one that identifies the current task ID of the instructions being executed, and another that contains binary values indicating which regions have completed the corresponding task interval. A flowchart illustrating an embodiment of a process for program execution by a tile processor is shown in FIG. 17E. While decoding an incoming instruction from the I-buffer, the tile processor also conveys the instruction to the I-buffer of the adjacent tile processor (steps 1782 and 1784 of FIG. 17E). The tile processor executes the incoming instructions until a remote access instruction causes the end of a task interval (shown in steps 1768 and 1770). When a task interval completes in a region of the DMEM, a record is kept of which regions the task interval has completed in (step 1772). In the embodiment of FIG. 17E, a task ID counter is used in keeping this record. Execution of the same task interval is then repeated in subsequent regions of the DMEM (steps 1774, 1776, 1768, and 1770), until the task interval has been executed in all regions (decision block 1776). At this point the next instructions received from the master tile processor will be for the next task interval, which is again executed over all regions.

The coherency requirement in the tile processors is maintained by a separate process of handling remote requests from the remote interconnect. The criterion for a load meeting the coherency requirement is that, at the tile processor and region that is the target of the load, the region must have completed the task interval corresponding to the task ID associated with the load. This is indicated by comparing the task ID of the load to the task ID completed by the region: the task ID of the region must be greater than or equal to the task ID associated with the load. Since this is the task ID of the task interval that performed the store, this criterion ensures that the target region has executed beyond the point of the store, and that the region has been written with the correct value.

Figure 21:
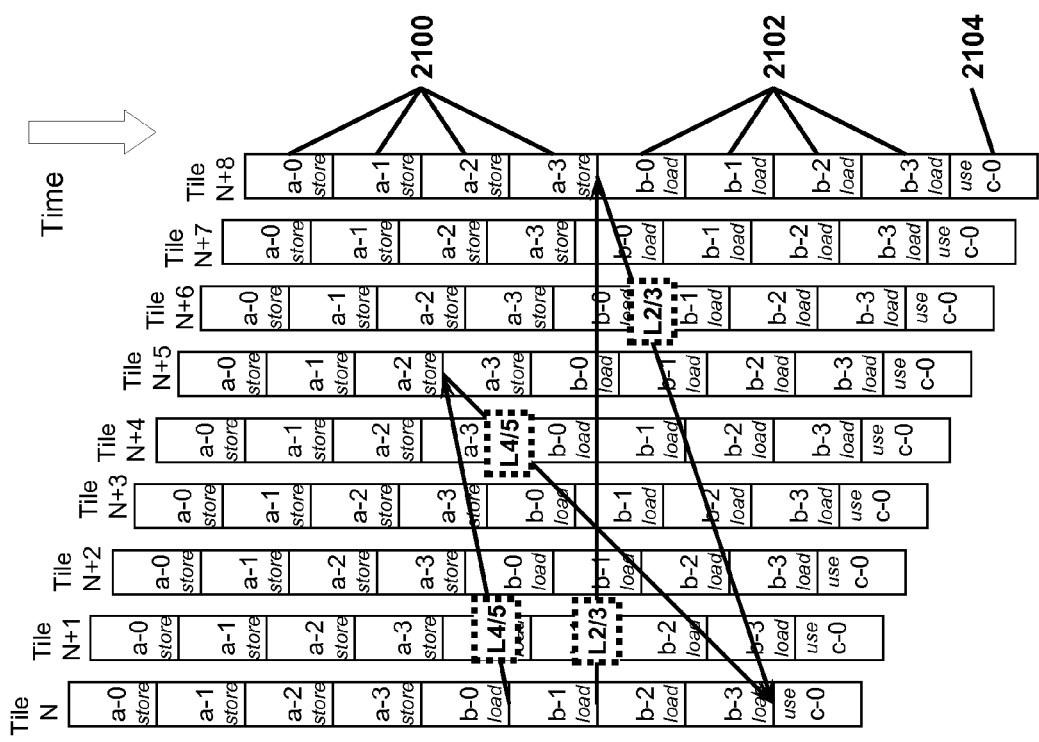
FIG. 21 shows the timing of dependency resolution avoiding delays.

If this criterion is not met, the access is held in the target tile processor until it is met, possibly creating an eventual stall. This stall can delay execution, but rarely does. This can be seen by the example in FIG. 21. This diagram is similar to FIG. 18A, but shows the execution of three tasks across 9 tile processors and 4 regions. Task interval 2100 (the same for all tile processors, though shown only for tile processor N+8 for clarity) ends with a store that defines data values. Task interval 2102 ends in a load that reads the values. Task interval 2104 (shown only for region 0 in this example) begins with a use of the loaded value. Task intervals are shown to a scale assuming 4 instructions in each interval. Because the adjacent tile processors execute the same instructions one cycle apart, in the embodiment of FIG. 21 tile processor N+4 begins task interval 2100 four cycles later than tile processor N, so that tile processor N+4 begins execution in its region 0 at the same time that tile processor N+1 begins execution in its region 1. The arrows labeled "L4/L5" and "L2/L3" represent dependency arcs for loads that traverse level 4 and level 5 of the tile interconnect, and loads that traverse level 2 and level 3, respectively. (Even though the nine tile processors are adjacent, accesses between them could require multiple levels of interconnect if the group of processors crosses a boundary between local groups of processors.) The arcs represent the maximum span of access that results in no delay in execution. This span is 22 regions for an L4/L5 route, and 34 regions for an L2/L3 route. Although not shown on the figure for clarity, a local and level 1 route can span up to 64 regions. These spans correspond to apron access of 22, 34, and 64 pixels respectively, which is much higher than typically required for visual processing. It should also be appreciated that this span typically is much larger, because stores, loads, and uses of load data typically are separated by many more instructions than shown in the figure. Furthermore, this span is much higher for configurations with 8 or 16 regions.

The systems, processors, and methods described herein provide coupling of visual data between tile processors, instruction sequencing to avoid performance degradation due to latency of load accesses, and a coherency mechanism that also typically avoids performance degradation due to data dependencies. The description provided herein is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of program execution by a master processor coupled to at least two data processors, wherein each data processor includes a data memory partitioned into a number of identical regions, said method comprising:

fetching a first instruction from an instruction memory in the master processor;

conveying the first instruction to an instruction buffer of a first data processor of the at least two data processors, for execution using data in a first region of the data memory of the first data processor;

determining whether execution of the first instruction by the first data processor requires movement of data between the data memory of the first data processor and the data memory of a different data processor;

if execution of the first instruction does not require movement of data between the first data processor and a different data processor, continuing to fetch and convey to the instruction buffer subsequent instructions until determining that a conveyed instruction requires said movement of data between data processors;

upon determining that execution of the conveyed instruction does require movement of data between the first data processor and a different data processor, retrieving the first instruction, and conveying, the first instruction to the instruction buffer of the first data processor, for execution using data memory in a consecutive adjacent region of the data memory of the first data processor; and repeating, for each adjacent region of the data memory in the first data processor, conveyance of a sequence of instructions ranging from the first instruction through the instruction requiring said movement of data between data processors, for execution using data stored in the respective region.

2. A method of program execution by a data processor coupled to at least one identical data processor and to a master processor, wherein the data processor includes an instruction buffer and a data memory partitioned into at least two identical regions, the method comprising:

receiving a program instruction in the instruction buffer;

simultaneously decoding the program instruction and conveying the instruction to an instruction buffer of an adjacent identical data processor;

executing the program instruction using data in a first region of the data memory;

determining whether execution of the instruction requires movement of data between the data memory of the data processor and a data memory of a different data processor;

if execution of the instruction does not require movement of data between the data processor and a different data processor, continuing to execute subsequent instructions received in the instruction buffer using data in the same region of the data memory, until determining that an executed instruction requires access to said movement of data between data processors;

upon determining that an executed instruction does require movement of data between the data processor and a different data processor, applying execution of the next instruction received to data stored in the next adjacent region of the data memory; and repeating, for each adjacent region of the memory execution of a sequence of instructions ending with the instruction requiring said movement of data between data processors, where the execution uses data stored in the respective region.

* * * * *

UNITED STATES PATENT AND TRADEMARK OFFICE
CERTIFICATE OF CORRECTION

Page 1 of 1

PATENT NO. : 9,183,614 B2
APPLICATION NO. : 13/602958
DATED : November 10, 2015
INVENTOR(S) : Johnson It is certified that error appears in the above-identified patent and that said Letters Patent is hereby corrected as shown below:

IN THE CLAIMS:

Claim 1, col. 21, line 18: delete the "," after the phrase "and conveying".

Claim 1, col. 21, line 20: delete the word "memory" after the phrase "execution using data".

Claim 2, col. 22, line 25: add the word --data-- after the phrase "region of the" and add a --,-- after the word "memory".

Signed and Sealed this
Twenty-second Day of March, 2016

Michelle K. Lee
*Director of the United States Patent and Trademark Office*